US012373011B2

(12) United States Patent
Repac

(10) Patent No.: US 12,373,011 B2
(45) Date of Patent: Jul. 29, 2025

(54) ENCLOSURE ASSEMBLY FOR COMPUTING SYSTEM IN AUTONOMOUS VEHICLES

(71) Applicant: GM Cruise Holdings LLC, San Francisco, CA (US)

(72) Inventor: Brittany Repac, Pleasanton, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 248 days.

(21) Appl. No.: 18/352,365

(22) Filed: Jul. 14, 2023

(65) Prior Publication Data

US 2025/0021143 A1 Jan. 16, 2025

(51) Int. Cl.
*G06F 1/20* (2006.01)
*B60R 16/02* (2006.01)
*B60W 60/00* (2020.01)

(52) U.S. Cl.
CPC ................ *G06F 1/20* (2013.01); *B60R 16/02* (2013.01); *B60W 60/001* (2020.02); *B60W 2420/00* (2013.01)

(58) Field of Classification Search
CPC combination set(s) only.
See application file for complete search history.

(56) References Cited

U.S. PATENT DOCUMENTS 7,315,099 B2 * 1/2008 Steffen .................. B60K 11/06 310/58
9,788,461 B2 * 10/2017 Van Gaal ........... H05K 7/20572
10,481,652 B2 * 11/2019 Rice ................... H05K 7/20927
11,153,994 B1 * 10/2021 Lo ............................ F01P 3/20
11,537,106 B2 * 12/2022 Watson, Jr. ........ H05K 7/20709
11,744,050 B2 * 8/2023 Lo ...................... H05K 7/20872 361/679.47
12,049,239 B2 * 7/2024 Mertel ............. B60W 60/0025
12,262,512 B2 * 3/2025 Bird ................... H05K 7/20854
2016/0305378 A1 * 10/2016 Gleason ........... F02M 35/10268
2020/0100398 A1 * 3/2020 Meghpara .......... H05K 7/20145
2021/0204444 A1 * 7/2021 Stefanoski ............ H01L 23/473
2021/0204445 A1 * 7/2021 Stefanoski ................ G06F 1/20
2022/0007550 A1 * 1/2022 Lo ............................ F01P 3/12
2023/0150546 A1 * 5/2023 Mertel ................. B60W 60/00 701/23

(Continued)

*Primary Examiner* — Lisa Lea-Edmonds
(74) *Attorney, Agent, or Firm* — CANTOR COLBURN LLP

(57) ABSTRACT

Autonomous driving computing systems in autonomous vehicles can include semiconductor chips with varying degrees of heat dissipation. The semiconductor chips are mounted on a printed circuit board, which together may be packaged in an enclosure assembly. The enclosure assembly may be mounted in the autonomous vehicle. Having a compact or low-profile enclosure assembly, and the harsh operating environment of the autonomous vehicle may pose a challenge for cooling the semiconductor chips and design of the enclosure assembly. Some cooling mechanisms can be difficult to manufacture, assemble, and/or service. An impeller-based intake subassembly can be combined with an air guidance plate that has a hollow structure that can direct air from the intake subassembly towards the printed circuit board through exhaust slots extending from the hollow structure, and air pathways to direct the air across the printed circuit board from the exhaust slots towards an impeller-based exhaust subassembly.

20 Claims, 17 Drawing Sheets

PRINTED CIRCUIT BOARD
AIR GUIDANCE PLATE
LOW-MEDIUM POWER DENSITY CHIP
LIQUID-COOLING MECHANISM (COLD PLATE OR IMMERSION MODULE)
METAL CHASSIS
MODULAR CARTRIDGE ENCLOSURE
COANDA EFFECT AIR FLOW
AIR GUIDANCE PLATE GUIDED AIR FLOW

(56) References Cited

U.S. PATENT DOCUMENTS

| | | | | |
|---|---|---|---|---|
| 2024/0023278 | A1 * | 1/2024 | Stefanoski ......... | H05K 7/20281 |
| 2024/0040741 | A1 * | 2/2024 | Schlotterbeck .... | H05K 7/20254 |
| 2024/0237275 | A1 * | 7/2024 | Karayacoubian .. | H05K 7/20872 |
| 2025/0021143 | A1 * | 1/2025 | Repac ....................... | G06F 1/20 |

* cited by examiner

ENCLOSURE ASSEMBLY FOR COMPUTING SYSTEM IN AUTONOMOUS VEHICLES

TECHNICAL FIELD

The present disclosure relates generally to autonomous vehicles (AVs), and more particularly, to enclosure assemblies provided for computing systems used in AVs.

BACKGROUND

AVs, also known as self-driving cars, driverless vehicles, and robotic vehicles, may be vehicles that use multiple sensors to sense the environment and move without human input. Technology in the AVs may enable the vehicles to drive on roadways and to perceive the vehicle's environment accurately and quickly, including obstacles, signs, and traffic lights. AVs can be used to transport passengers (e.g., human beings, animals, etc.) and cargo.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Overview

Figure 1:
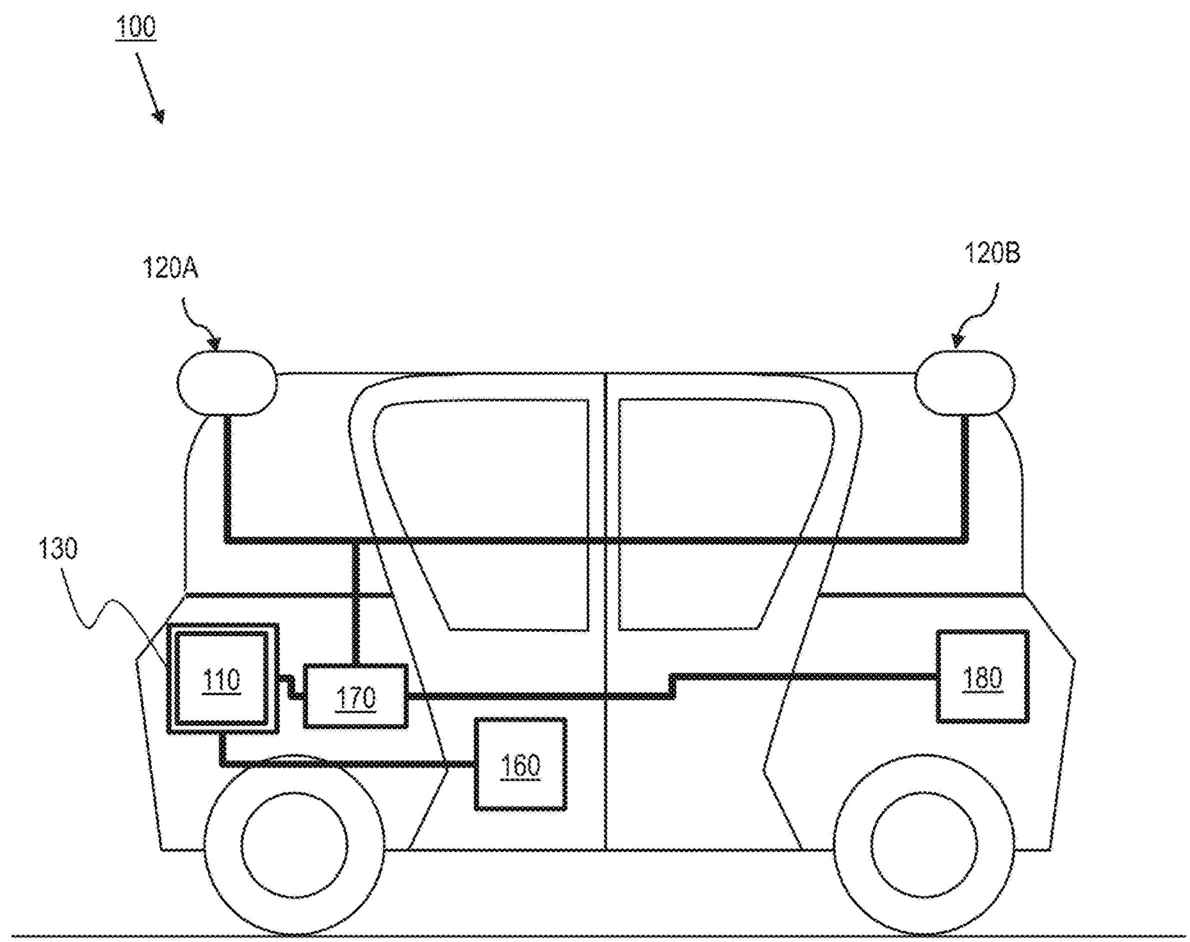
FIG. 1 illustrates an exemplary AV having a computing system, according to some embodiments of the disclosure.

Autonomous driving computing systems in AVs can include semiconductor chips with varying degrees of heat dissipation. The semiconductor chips are mounted on a printed circuit board, which together may be packaged in an enclosure assembly. Some semiconductor chips, such as high power density semiconductor chips, when deployed in automotive or aerospace environments, may be cooled using precision liquids or may be cooled with high flow rate air flow. Some cooling mechanisms can be difficult to manufacture, assemble, and/or service.

Liquid-cooling systems using cold plates can be an effective cooling method, but may come with a plethora of manufacturing risks, failure risks, higher costs, high mass, high energy consumption, and serviceability barriers. Manufacturing and failure risks include (but not limited to) brazing quality issues or fracture, quick-disconnect seal quality or degradation issue, corrosion of aluminum or copper plate, and risk of thermal interface material (TIM) delamination or over compression due to shock and vibration and mismatched thermal expansion rates of material stack-up. The risks can lead to coolant leaks and damage to the semiconductor chips, and potentially cause a short (or even a fire) if the coolant has electrically conductive fluid such as water. The manufacturing process to produce liquid-cooling cold plates can be expensive and may take multiple steps that can be performed by a narrow selection of vendors. High mass is attributed to cold plate materials which are typically aluminum and copper. High power consumption and costs of a liquid-cooled system may be due to the pump to circulate the coolant to/from the computer and heat exchanger. Cold plates can be difficult to service due to the procedure to drain the coolant and removal of a two-part TIM (if used, a two-part TIM may be hard like cement), which takes extensive amounts of time and can potentially damage the semiconductor chips during service.

Air-cooling systems using axial and blower fans can be cheaper than liquid-cooling systems and may have shorter sourcing lead times. However, the volumetric flow rate of air flow is limited by the fan cross-sectional area and by having only one-row of blades. The larger cross-sectional areas required for higher flow rate air-cooling may not be ideal for low-profile, compact enclosures or areas where space to install the computing system is limited. Air-cooling system performance can drop or fail in higher ambient environment temperatures, so air-cooling systems may demand higher and targeted air flow rate to adequately cool the high power density semiconductor chips throughout the entire printed circuit board surface. Air-cooling systems can be vulnerable to dust ingress.

The enclosure assembly may be mounted in the autonomous vehicle. Having a compact or low-profile enclosure assembly, and the harsh operating environment of the autonomous vehicle may pose a challenge for adequately cooling the semiconductor chips and mechanical design of the enclosure assembly. In automotive or aerospace contexts, the enclosure assembly is preferably structurally strong and rigid, but has low mass and cost targets.

The present disclosure describes enclosure assemblies that include an air guidance plate, an intake subassembly, and an exhaust subassembly. An impeller-based intake subassembly can be combined with the air guidance plate that has a hollow structure that can direct air from the intake subassembly towards the printed circuit board through exhaust slots extending from the hollow structure. The air guidance plate further includes air pathways to direct the air across the printed circuit board from the exhaust slots towards an impeller-based exhaust subassembly.

The air guidance plate can preferably be made from high-impact, thermal-resistant plastic. The air pathways in the air guidance plate may be customized to target and/or navigate around high power density semiconductor chips (with heat sinks or liquid-cooling modules) and low-medium power density semiconductor chips on the printed circuit board. The air guidance plate may be snapped or fastened directly onto the printed circuit board for ease of assembly, increase rigidity of the printed circuit board, and (if made from plastic or other non-conductive material) provide an additional dielectric protection layer between a metal chassis or modular cartridge enclosure and the printed circuit board. The air guidance plate may have additional mounting support from the metal chassis and/or modular cartridge enclosure. The additional mounting support may improve concentric alignment of the hollow structure to the intake subassembly and offer additional rigidity improvement for the printed circuit board.

The hollow structure integrated within the air guidance plate can conform to a low-profile cross-sectional space offered by the metal chassis or the modular cartridge enclosure. Using the Coanda effect and with strategically sized and spaced exhaust slots, the hollow structure can enable air guidance plate and impellers to more effectively cool low-profile semiconductor chips across a large printed circuit board surface area, reduce static pressure in computer chassis, and reduce turbulent air flow. The hollow structure removes the limitation of air flow direction (e.g., offering a 90-degree bend) without significant linear air velocity loss due to a smooth and conformable geometry of the exhaust slots and the Coanda effect.

The impeller-based intake and exhaust subassemblies each include a housing, an impeller (e.g., a jet impeller), and a motor. The impeller and the motor are located within the housing. The motor may have a high angular velocity. Use of an impeller and the motor may accelerate and rapidly increase the air mass flow rate through small orifices. The runway or path between ambient air and the air guidance plate may offer flexibility to axially add more impeller blades (e.g., more rows) to further increase mass flow rate. The flexibility is not available to blower fans due to the low-profile limitations of the enclosure. The impeller-based intake and exhaust subassemblies can be manufactured and assembled separately from the metal chassis, the modular cartridge enclosure (if used), and the air guidance plate. The impeller-based intake and exhaust subassemblies can be twisted on (e.g., the subassemblies may each have a threaded end) or fastened onto the metal chassis and/or the modular cartridge enclosure. Ease of installing and removing the impeller-based intake and exhaust subassemblies may enable easier servicing of the computing system.

The impeller-based intake subassembly may include an in-line filter for dust and particulates. The impeller-based intake subassembly may include a vertical drip protection collar. The filter and/or the collar may support meeting automotive requirements, compliance, and/or ratings (e.g., IP5K2) to prevent dust and water ingress for vertical drip application.

One or more aspects of the enclosure assembly design can reduce costs, mass, manufacturing complexity, and risks, while improving the computing system's ability to be installed in compact envelopes in high ambient temperature environments and serviceability. The housing of the impeller-based intake and exhaust subassemblies, the air guidance plate (including the hollow structure and air pathways) can be made from high-temperature, impact-resistant plastic. They may be injection molded (e.g., with solvent-dissolvable cores) or 3D printed, thereby offering more options for manufacturers and reducing manufacturing time and mass. The enclosure assembly may be modular and can be adaptable to various form factors. Air pathways in the air guidance plate can be customized to suit or fit different arrangements of semiconductor chips on the printed circuit board. The air pathways may be designed to target specific semiconductor chips. The air pathways can coincide with precision liquid-cooling modules (e.g., with cold plates or with immersion), if some semiconductor chips demand stringent cooling requirements. Ability to integrate with and cool the computing system together with precision liquid-cooling modules can reduce overall costs, energy consumption, manufacturing risks, by reducing the coolant volumetric flow rate (e.g., lower pump speed and size, lower fluid volume demand), reducing size of cold plate or immersion module size, reducing mass, lowering compression preloads for module installation, lowering pressures that contribute to leaks, lowering risks of deflection/fractures (that affect lower cold plates with higher compression loads), and increasing first modal frequency with lower mass.

Further details relating to the aspects mentioned above are further illustrated through the FIGURES and the accompanying description. While many examples of the enclosure assembly are described in use with an autonomous vehicle, the enclosure assembly may be used with other types of vehicles that have a computing system, such as semi-autonomous vehicles, aircrafts, trains, trams, ships, etc.

Exemplary AV with a Computing System

FIG. 1 illustrates exemplary AV 100 having computing system 110, according to some embodiments of the disclosure. AV 100 may include one or more sensors 120 (shown as sensor(s) 120A and sensors 120B) to sense an environment of AV. AV 100 may include vehicle controls 180 that can cause AV 100 to navigate on the roadways. AV 100 may include a network switch 170 that communicably connects the one or more sensors 120, the vehicle controls 180, and the computing system 110. Computing system 110 may include or be an autonomous driving computing system (ADSC). Computing system 110 may include one or more processors (e.g., semiconductor chips) mounted on a printed circuit board. In some cases, computing system 110 may include multiple computing systems (each having one or more processors and a printed circuit board). The computing systems may cooperate with each other and carry out different functionalities. The computing systems may be redundant versions of each other. Computing system 110 may include one or more non-transitory computer-readable media storing instructions, that when executed by the one or more processors, cause the one or more processors to generate signals to control AV 100 (e.g., using vehicle controls 180). Computing system 110 may control AV 100 (e.g., via the vehicle controls 180) based on data from the one or more sensors 120. AV 100 may include a power source 160, and computing system 110 may receive power from power source 160.

Computing system 110 may include and/or is enclosed in an enclosure assembly 130. Computing system 110, along with the enclosure assembly 130 may be mounted in AV 100. The enclosure assembly 130 may be designed to enclose a computing system, such as an ADSC, and allow for the enclosed computing system to be mounted in a vehicle such as AV 100.

In some cases, the enclosure assembly may include an opening to receive a power connection. In some cases, the enclosure assembly comprises an opening to receive a network connection. The network connection may communicably connect the computing system 110 to the sensors 120 and the vehicle controls 180.

Exemplary Blade Server Type Chassis System

Figure 2:
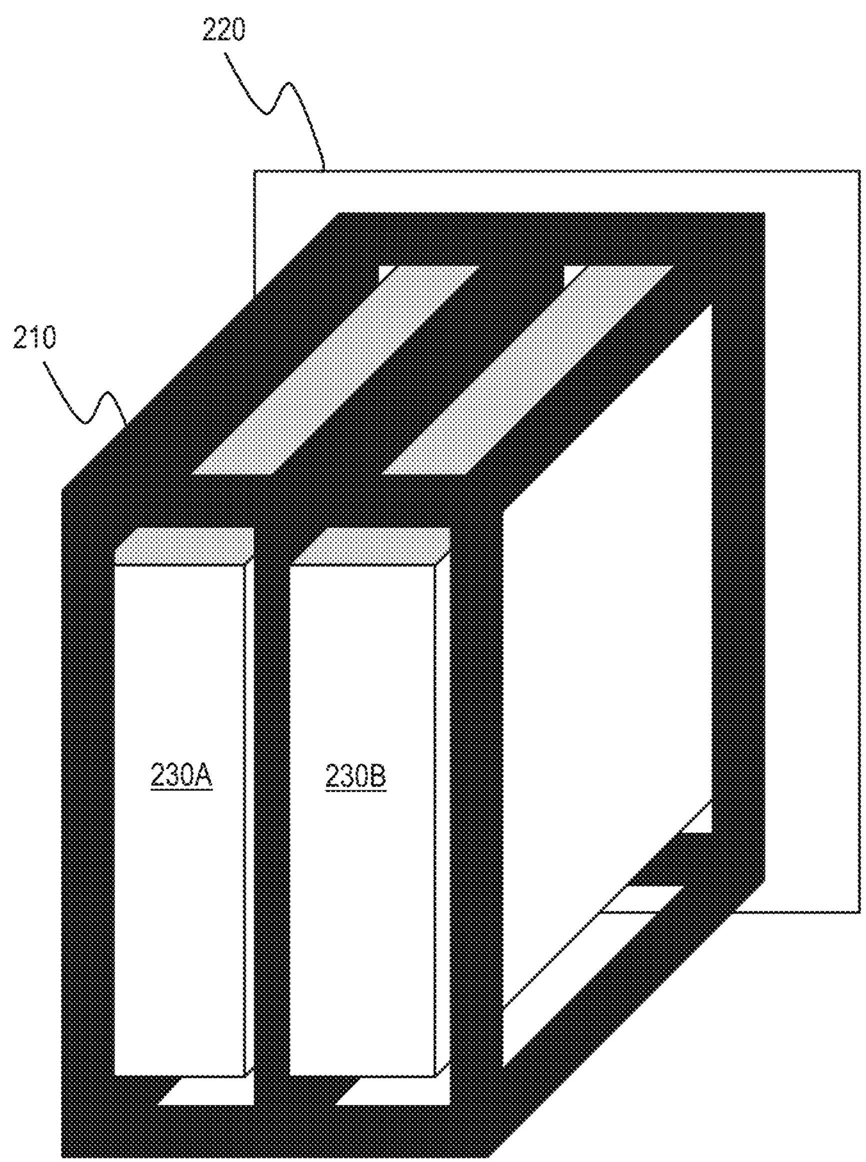
FIG. 2 illustrates a blade server type chassis system usable in an AV, according to some embodiments of the disclosure.

FIG. 2 illustrates a blade server type chassis system usable in AV 100, according to some embodiments of the disclosure. The blade server type chassis system may include rack 210 and backplane 220. In some cases, rack 210 may form the metal chassis structure as seen in the FIGURES or may be provided to hold or support the metal chassis as seen in the FIGURES. The blade server type chassis system may allow technicians to insert (install) and/or remove (uninstall) ADSCs 230 (shown as ADSC 230A and ADSC 230B) onto the backplane 220 easily. ADSCs 230 may be in the form of modular cartridges and have modular cartridge enclosures (or connector structures that facilitate mechanical and electrical coupling of ADSCs 230 to the backplane 220). Backplane 220 may provide power connectivity to ADSCs 230. Backplane 220 may provide network/data connectivity to ADSCs 230. As illustrated, the blade server type chassis system may limit the profile of the ADSCs 230 and/or the space available surrounding the ADSCs 230. The limitations may pose a challenge to cooling high power density components (e.g., semiconductor chips) in the ADSCs.

Exemplary Enclosure Assembly for an Air-Cooled ADSC

Figure 3:
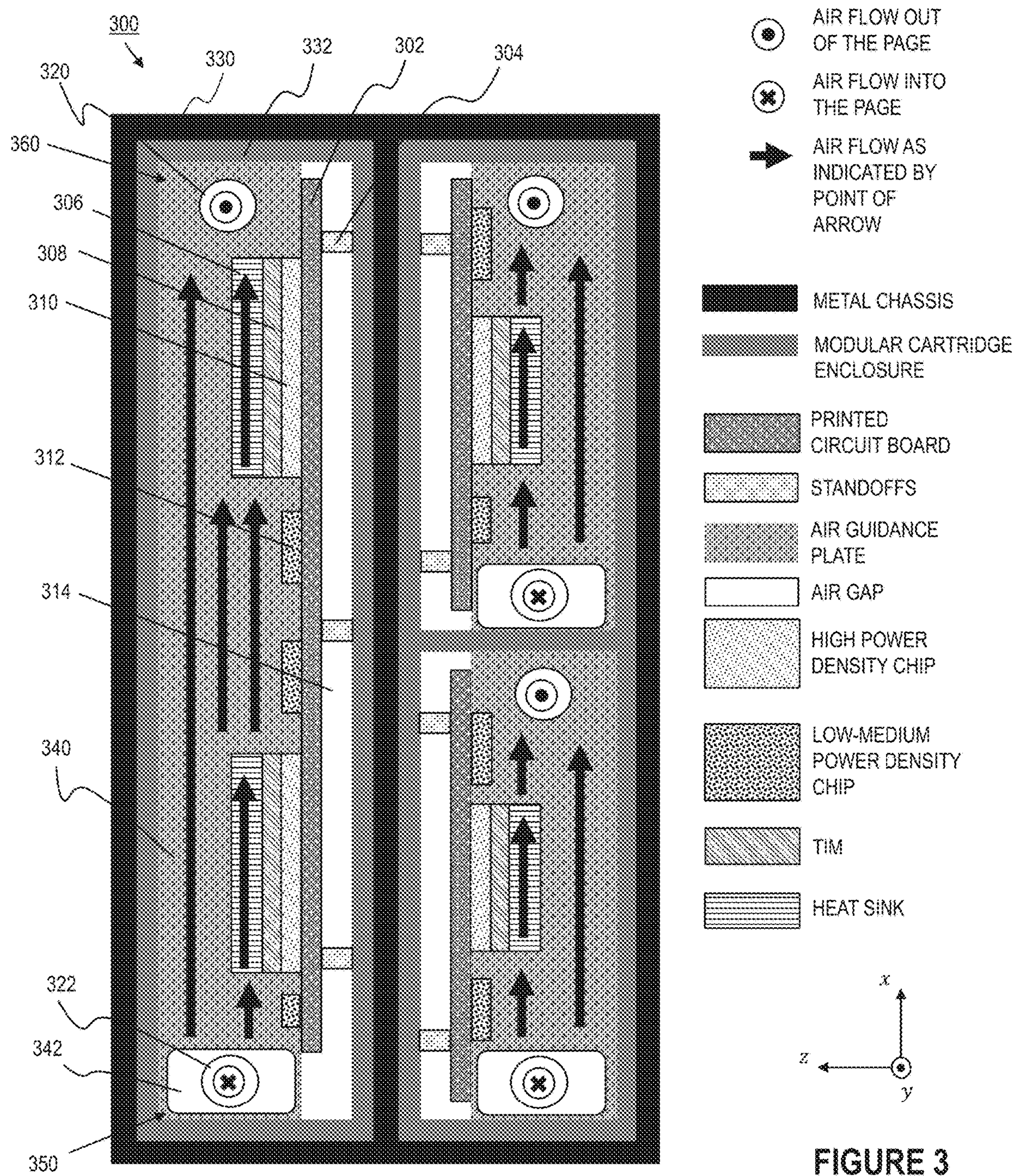
FIG. 3 illustrates a side view of an air-cooled autonomous driving computing system having the enclosure assembly, according to some embodiments of the disclosure.
Figure 4:
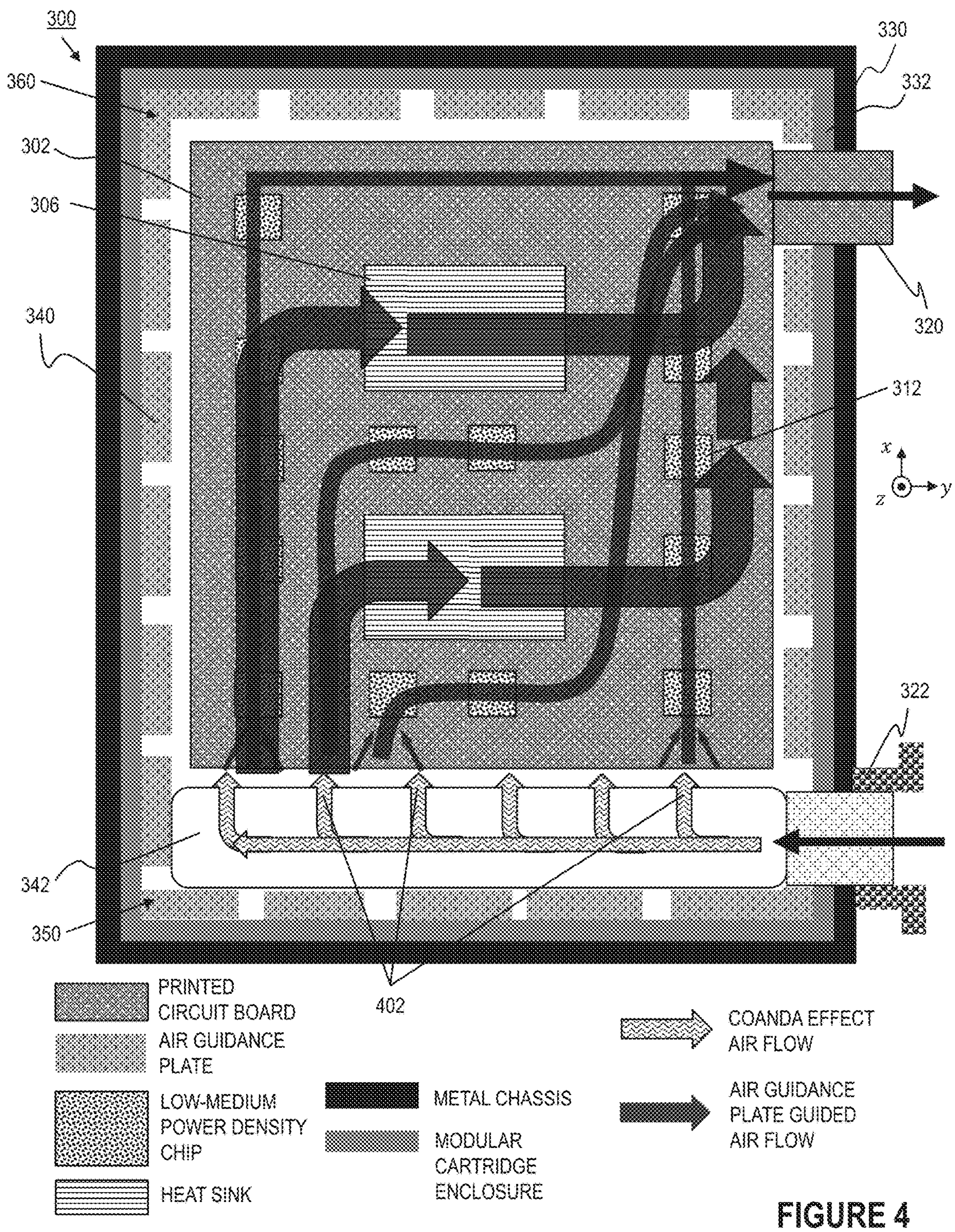
FIG. 4 illustrates a front view of an air-cooled autonomous driving computing system having the enclosure assembly, according to some embodiments of the disclosure.
Figure 5:
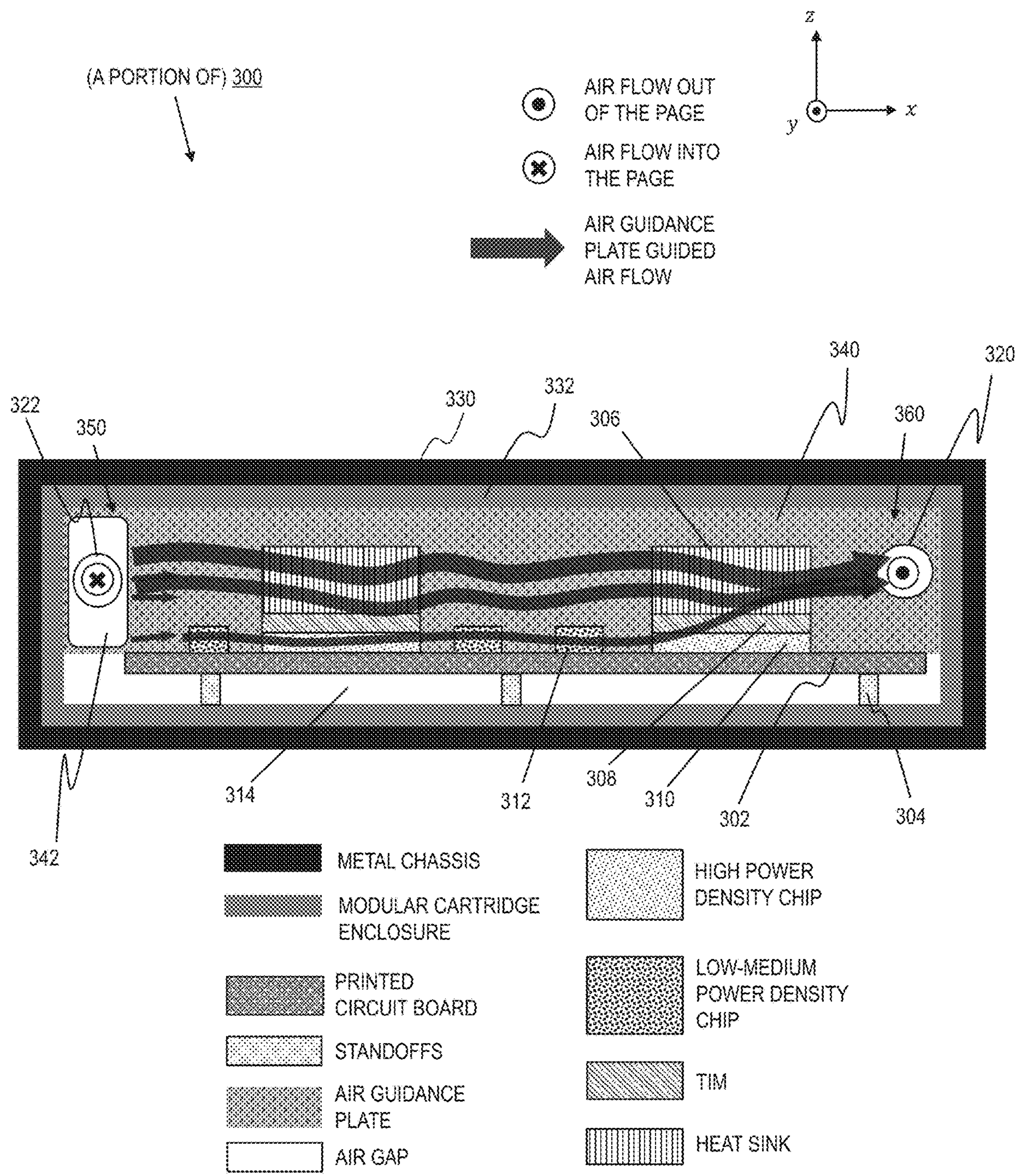
FIG. 5 illustrates a side view of an air-cooled autonomous driving computing system having the enclosure assembly, according to some embodiments of the disclosure.

FIG. 3 illustrates a side view of air-cooled ADSC 300 having the enclosure assembly, according to some embodiments of the disclosure. FIG. 4 illustrates a front view of air-cooled ADSC 300 having the enclosure assembly, according to some embodiments of the disclosure. FIG. 5 illustrates a (closer look) side view of air-cooled ADSC 300 having the enclosure assembly, according to some embodiments of the disclosure. In FIGS. 3-5, some elements of ADSC 300 may be transparent so that the viewer can see-through the ADSC 300 or allow certain elements of ADSC 300 to be exposed.

In the examples illustrated in FIGS. 3-5, the air-cooled ADSC 300 may include three printed circuit boards, each having semiconductor chips mounted thereon. Aspects of the enclosure assembly are described in relation to one of the printed circuit boards and semiconductor chips mounted thereon (some details may be omitted for brevity and readability). It is envisioned by the disclosure that the aspects of the enclosure assembly may be applied and replicated to one or more printed circuit boards in ADSC 300. It is also envisioned by the disclosure that not all high power semiconductor chips illustrated are air-cooled (they may be liquid-cooled). In some embodiments, all high power semiconductor chips are all air-cooled.

ADSC 300 may include printed circuit board 302. The printed circuit board 302 may span the x and y directions. Printed circuit board 302 may have a plurality of standoffs 304 (spaced across the printed circuit board 302) that affix printed circuit board 302 to metal chassis 330 and/or modular cartridge enclosure 332 (if included). There may be an internal air gap 314 between printed circuit board 302 and metal chassis 330 and/or modular cartridge enclosure 332 (if included). The internal air gap 314 may be created by the standoffs 304. The internal air gap 314 may separate printed circuit board 302 and the metal chassis 330. Printed circuit board 302 may be rigid. Printed circuit board 302 may include electronic components mounted thereon. Electronic components may be spatially placed on the printed circuit board 302 on a plane formed by the x and y directions. The electronic components may include one or more semiconductor chips mounted on top of (a component side of) printed circuit board 302.

ADSC 300 may include high power density semiconductor chip 310. Examples of high power density semiconductor chip 310 may include central processing units (CPUs), graphical processing units (GPUs), artificial intelligence processors, (high-speed) transceivers, quantum computers, semiconductor chips produced using fine semiconductor processes, and semiconductor chips produced using ultra-fine semiconductor processes. High power density semiconductor chip 310 may have relatively high heat dissipation (and a heat gradient or areas of heat concentration). High power density semiconductor chip 310 may be air-cooled with heat sink 306. Heat sink 306 may have a structure that helps to transfer heat away from the high power density semiconductor chip 310 and to the surrounding air or area. Heat may travel through the heat sink 306 through conduction. Heat sink 306 may have fin-like structures to allow air to pass through and over the surfaces of the fin-like structures to carry away the heat conducted through heat sink 306. Heat sink 306 may be made from aluminum. Heat sink 306 may be made from copper. TIM 308 may be placed between heat sink 306 and high power density semiconductor 310, to affix heat sink 306 to high power density semiconductor chip 310 and/or to have heat thermally transferred from high power density semiconductor chip 310 to heat sink 306. TIM 308 may thermally couple the heat sink 306 and high power density semiconductor chip 310. Examples of TIM 308 may include thermal paste, thermal adhesive, thermal gap filler, thermally conductive pad, thermal tape, phase-change materials, metal TIMs, etc.

ADSC 300 may include low-medium power density semiconductor chip 312. Examples of low-medium power density semiconductor chip 312 may include audio processing chips, memory (storage) chips, memory access controllers, microprocessors, analog chips with passive and/or active circuit components, and application specific integrated circuits (ASICs). Having air flow around and/or over the low-medium power density semiconductor chip 312 may be sufficient to keep low-medium power density semiconductor chip 312 from overheating during operation.

To provide some cooling functionality across the component side of printed circuit board 302, ADSC 300 includes an in-vehicle computing system enclosure assembly. The in-vehicle computing system enclosure assembly may include: air guidance plate 340, intake subassembly 322, and exhaust subassembly 320.

Intake subassembly 322 may be located or installed adjacent to a first end 350 of the air guidance plate. The first end 350 of the air guidance plate may be the "bottom" end of the air guidance plate (corresponding to the bottom of the page for FIGS. 3 and 4, and left side of the page for FIG. 5). Exhaust subassembly 320 may be located or installed adjacent to a second end 360 of the air guidance plate. The second end 360 of the air guidance plate may be the "top" end of the air guidance plate (corresponding to the top of the page). Preferably, when ADSC 300 is in operation, the second end 360 is higher than the first end 350 because heat naturally rises upwards, which may assist hot air to travel towards the exhaust subassembly 320 in the x direction and out of the ADSC 300. When the enclosure assembly is mounted in a vehicle, the enclosure assembly is preferably oriented in a way where the second end 360 is located vertically higher than the first end 350 of the air guidance plate.

Intake subassembly 322, when in operation, can push air from outside of ADSC 300 and into ADSC 300 in the −y direction. Intake subassembly 322 is preferably impeller-based due to the limited space available with ADSC 300. Impeller-based systems can fit through relatively small holes, openings, and orifices and offer higher mass air flow rates (relative to blower fans). Impeller-based systems may also offer the flexibility to increase mass air flow by implementing more rows of fans/blades. Additional details of intake subassembly 322 are discussed in FIG. 9. Exhaust subassembly 320, when in operation, can push air from inside of ADSC 300 and out of ADSC 300 in the +y direction. Exhaust subassembly 320 is preferably impeller-based as well for similar reasons as the intake subassembly 322. The rate of air being pushed into ADSC 300 by intake subassembly 322 and the rate of air being pushed out of ADSC 300 by exhaust subassembly 320 are preferably chosen to ensure there is no excess negative pressure or positive pressure within ADSC 300, and to ensure air can flow in and out of ADSC 300 efficiently and effectively. Additional details of exhaust subassembly 320 are discussed in FIG. 10. Intake subassembly 322 and exhaust subassembly 320 are shown to be provided on the same side of ADSC 300. However, it is envisioned by the disclosure that the intake subassembly 322 and exhaust subassembly 320 can be provided on opposite sides of ADSC 300 (if space allows).

Air guidance plate 340 may have a cover-like structure that encases or shields the electronic components side of printed circuit board 302 (not the side with standoffs 304). Air guidance plate 340 may be disposed over the printed circuit board 302 having the semiconductor chips mounted thereon (e.g., high power density semiconductor chip 310 and low-medium power density semiconductor chip 312). The technical task of the air guidance plate 340 is to take air from intake subassembly 322, and direct air across the x and y plane to cool various components on printed circuit board 302.

To guide or direct air from intake subassembly 322 into ADSC 300, air guidance plate 340 has a hollow structure 342 at the first end 350 of air guidance plate 340. Hollow structure 342 may be formed within air guidance plate 340, e.g., at the first end 350 of air guidance plate 340. Hollow structure 342 may have a length that extends in the y direction.

Hollow structure 342 may have a main air channel that extends in a second direction (e.g., in the −y direction) from intake subassembly 322. The main air channel may be oblong-shaped. The second direction may be perpendicular to the first direction (e.g., in the +x direction). Hollow structure 342 can have a plurality of exhaust slots 402 that extend from the main air channel in the first direction (e.g., in the +x direction, or in a direction that is perpendicular to a length of the oblong-shaped channel). Hollow structure 342 may direct the air through the exhaust slots 402 so that air flows in the first direction towards components on printed circuit board 302. In FIGURE 4, 402 points to some exemplary locations of exhaust slots 402). Hollow structure 342 can take air from the intake subassembly 322 and direct air through the hollow structure 342 (e.g., in the −y direction) and out of the exhaust slots in a first direction (e.g., in the +x direction) towards the second end 360 of the air guidance plate 340. Hollow structure 342 can change air flow direction in a compact area. Hollow structure 342 may implement inner surfaces and channels/slits to guide air out of exhaust slots 402 efficiently while leveraging the Coanda effect. The exhaust slots 402 may be formed with smooth curved channels that direct air out of hollow structure 342 and towards the first direction (e.g., +x direction). The smooth curved channels preferably have smooth curved inner surfaces to leverage the Coanda effect to direct air in the desired direction and through the channels efficiently. The exhaust slots 402 may be strategically placed in the y direction and/or the z direction to target specific areas or components on printed circuit board 302. In some cases, the exhaust slots 402 may be located near one or more ones of the semiconductor chips located near the first end 350 of the air guidance plate 340. Additional details of the hollow structure 342, including cross-sectional views of hollow structure 342 are illustrated with FIGS. 11-14.

To guide or direct air across the printed circuit board 302, the air guidance plate 340 has air pathways that can guide air to flow in the +x direction and in the +y direction out of exhaust subassembly 320, as illustrated in FIG. 4. Air pathways may guide the air from the exhaust slots 402 towards a second end 360 of the air guidance plate 340 and the exhaust subassembly 320. The air pathways can guide air (without reversing direction of air flow in the x direction or y direction) towards exhaust subassembly 320 so that hot air may exit ADSC 300 efficiently. Air pathways may also guide air in the z direction to target certain components on printed circuit board 302, as illustrated in FIG. 5. If intake subassembly 322 and exhaust subassembly 320 are positioned on opposite sides of ADSC 300, the air guidance plate 340 may have air pathways that can guide air to flow in appropriate directions without reversing direction of air flow in the x direction or y direction.

Air pathways of air guidance plate 340 may be provided or designed to implement desired air flow patterns across printed circuit board 302. Air pathways may be placed to avoid certain areas. Air pathways may be placed to get around obstacles in the ADSC 300. Air pathways may be placed to target air to flow in certain areas. Air pathways may be shaped to direct air in a certain direction. Air pathways may be sized to achieve desired mass flow rates.

In some embodiments, the air pathways may be formed in a first side of the air guidance plate 340 that faces printed circuit board 302. The air pathways may be formed by troughs that extend from respective exhaust slots 402 towards the exhaust subassembly 320. The air pathways may be formed by cavities or tracks. In some embodiments, the air pathways may be formed inside air guidance plate 340. The air pathways may form a multi-lattice like structure that guides air from exhaust slots 402 towards exhaust subassembly 320. A multi-lattice like structure can be formed in air guidance plate 340 from a network of channels extending from the exhaust slots 402 towards exhaust subassembly 320. The multi-lattice-like structure may be three-dimensional (forming a network of channels in the x, y, and z directions). The channels may have different diameters (or widths) to deliver cold air to specific chips at different mass flow rates and exhaust heat dissipation efficiently while minimizing turbulence. The network of channels may be designed to circumvent obstacles (if any).

The air pathways may be shaped to direct air over certain components. The air pathways may be sized to direct more mass air flow over certain components. The air pathways may be placed to ensure air is flowing over all components on the printed circuit board 302. The air pathways may be placed to achieve an even heat gradient across the printed circuit board 302.

In the example shown in FIG. 4, the air pathways of air guidance plate 340 may ensure cold air is delivered to low-medium power density semiconductor chips (e.g., low-medium power density semiconductor chip 312) on printed circuit board 302. The air pathways may ensure cold air is delivered over the heat sinks (e.g., heat sink 306) on high power density semiconductor chips (e.g., through the fins of the heat sink) on printed circuit board 302. The mass flow rates of cold air over the heat sinks may be higher than the mass flow rates of cold air over the low-medium power density semiconductor chips. Air may flow through the air pathways in the +x and +y directions across the printed circuit board 302 towards exhaust subassembly 320.

In the example shown in FIG. 5, the air pathways of air guidance plate 340 may direct cold air towards the heat sinks (e.g., heat sink 306) on high power density semiconductor chips (e.g., through the fins of the heat sink) on printed circuit board 302. The air pathways may direct cold air to low-medium power density semiconductor chips (e.g., low-medium power density semiconductor chip 312) on printed circuit board 302. The mass flow rates of cold air over the heat sinks may be higher than the mass flow rates of cold air over the low-medium power density semiconductor chips. Air may be directed by the air pathways in the z direction towards at least a subset of components (e.g., the semiconductor chips) on the printed circuit board 302.

Air guidance plate 340 may be made from plastic material. Plastic materials can offer dielectric protection. Plastic materials are low in mass. Plastic materials are less costly than other materials. The plastic material can include high-impact, thermal-resistant plastic. The air guidance plate 340 can add overall rigidity and structural integrity to the ADSC 300. Air guidance plate 340 may be 3D printed. Air guidance plate 340 may be injection molded with solvent-dissolvable cores to form the hollow structure and air pathways during fabrication of air guidance plate 340.

Air guidance plate 340 may be removably affixed onto printed circuit board 302 during assembly. Air guidance plate 340 may be snapped onto printed circuit board 302 using snapping mechanisms. Examples of snapping mechanisms include (annular, cantilever, or torsional) snap fits, and snap locks. Air guidance plate 340 may be fastened onto printed circuit board 302 using fasteners (e.g., screws, pins, standoffs, nuts, etc.). Air guidance plate 340 may be glued onto printed circuit board 302 using an adhesive.

Metal chassis 330 may enclose the air guidance plate 340 and the printed circuit board 302 (and semiconductor chips mounted thereon). If used, ADSC may include modular cartridge enclosure 332 (or structure that allows ADSC to be easily inserted onto and/or removed out of a backplane mechanically and electrically).

Figure 6:
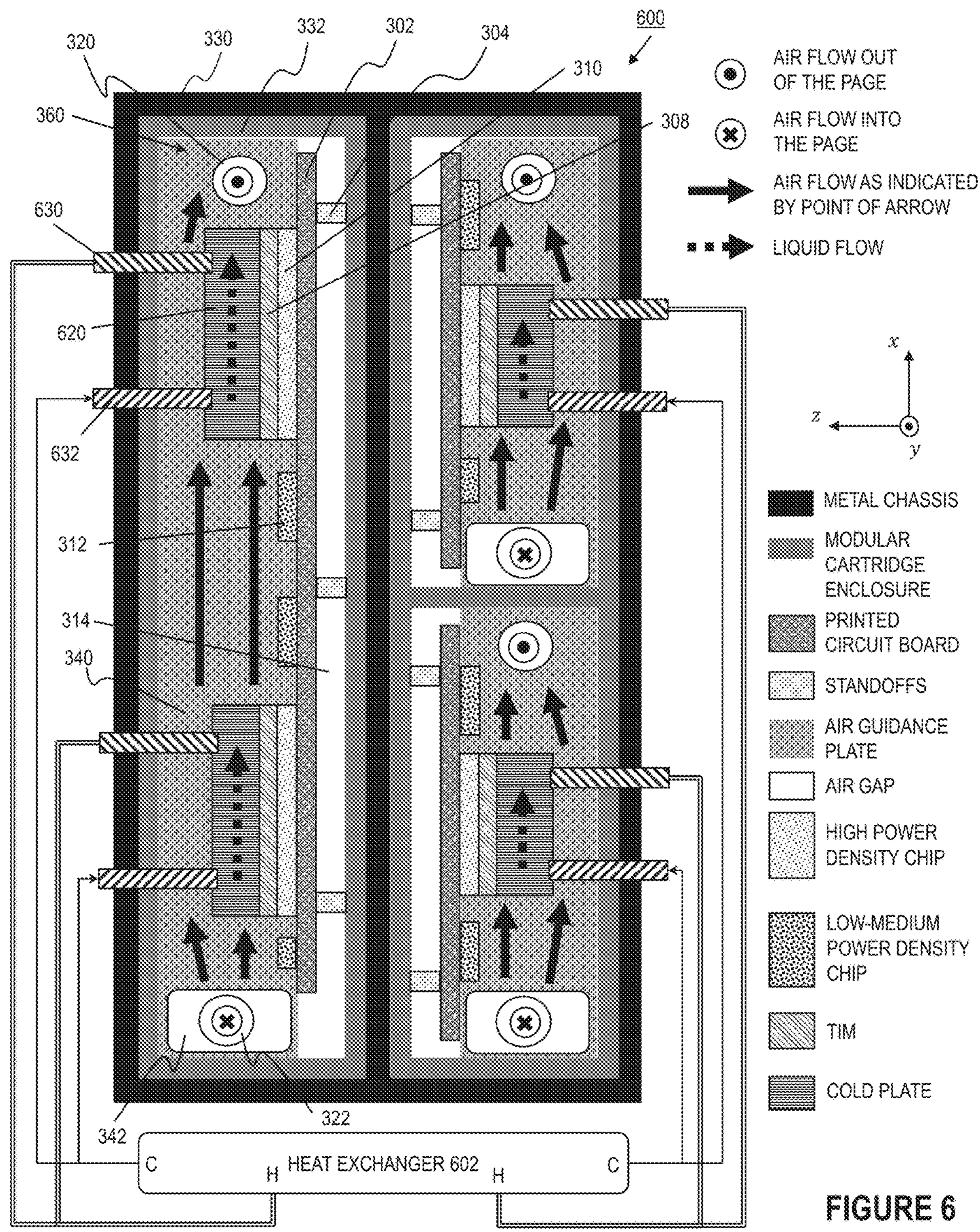
FIG. 6 illustrates a side view of a liquid-cooled autonomous driving computing system with cold plates, the liquid-cooled autonomous driving computing system having the enclosure assembly, according to some embodiments of the disclosure.
Figure 7:
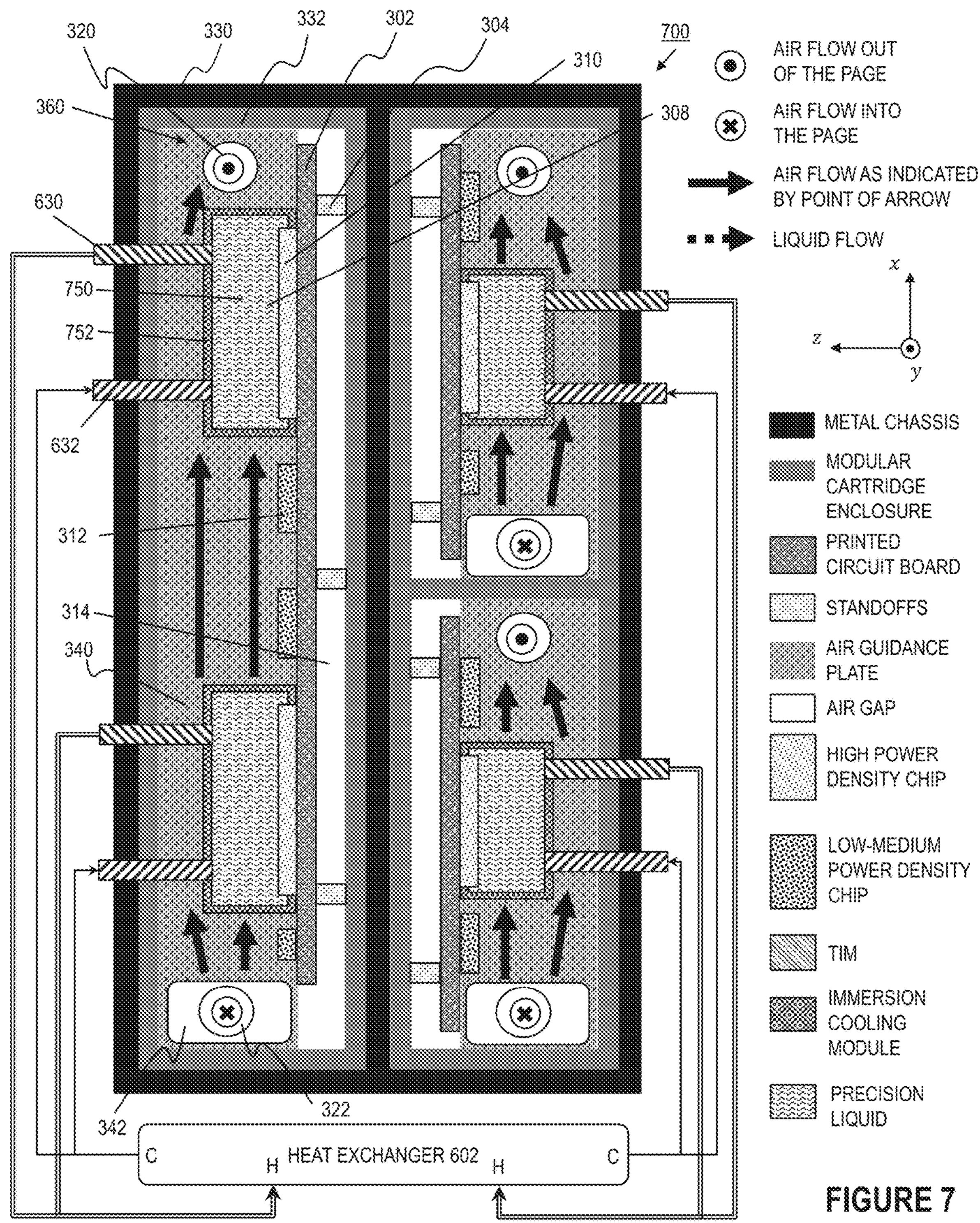
FIG. 7 illustrates a side view of a liquid-cooled autonomous driving computing system with immersion, the liquid-cooled autonomous driving computing system having the enclosure assembly, according to some embodiments of the disclosure.
Figure 8:
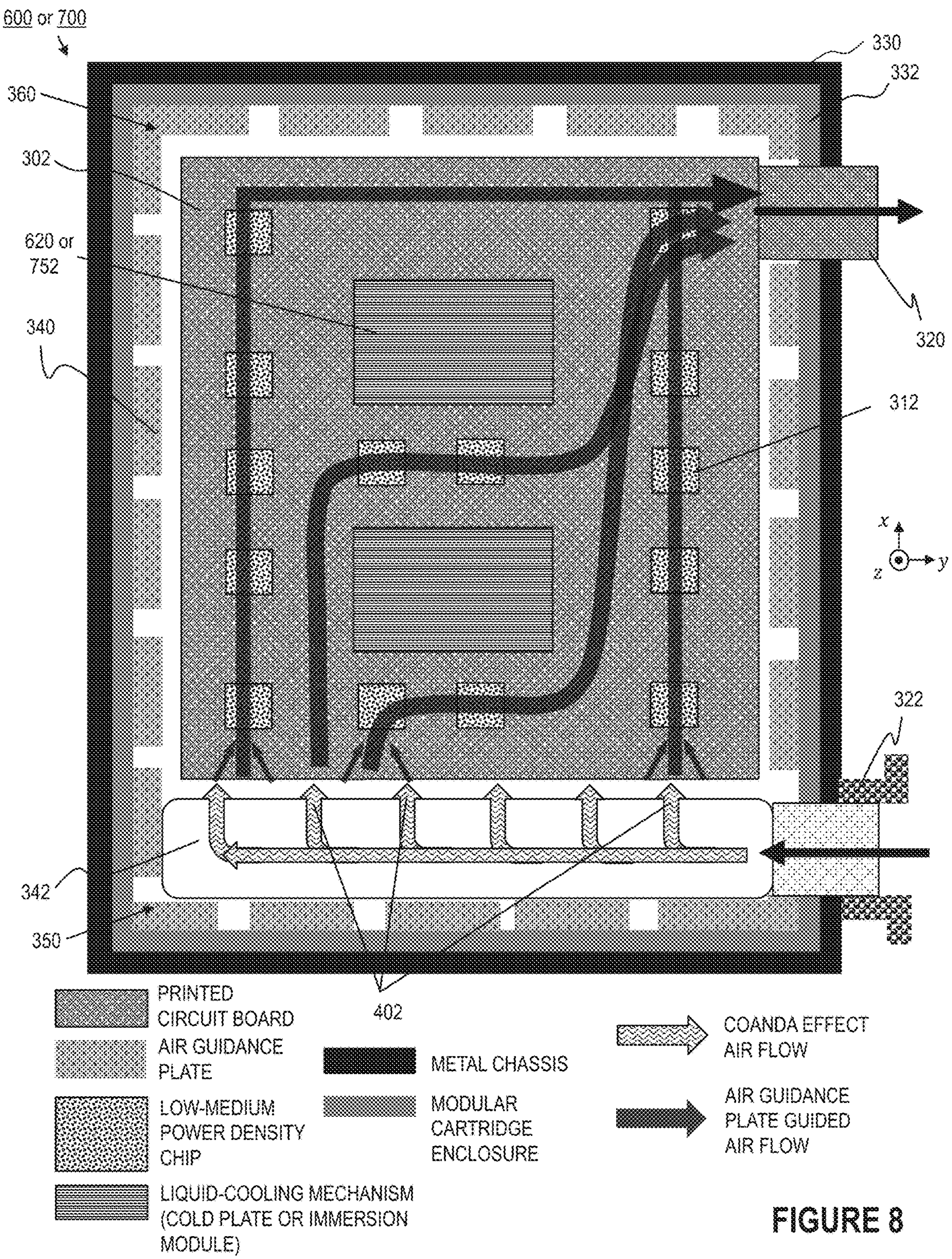
FIG. 8 illustrates a front view of a liquid-cooled autonomous driving computing system with cold plates or with immersion, according to some embodiments of the disclosure.

Exemplary Enclosure Assembly for an ADSC with Liquid-Cooling Provided for High Power Density Semiconductor Chips In some cases, the enclosure assembly can be used in conjunction with liquid-cooling mechanisms provided for the high power density semiconductor chips, to provide additional cooling for the ADSC. The enclosure assembly is similar to the ones illustrated in FIGS. 3-5, with some differences. FIG. 6 illustrates a side view of liquid-cooled ADSC 600 with cold plates, the liquid-cooled ADSC 600 having the enclosure assembly, according to some embodiments of the disclosure. FIG. 7 illustrates a side view of liquid-cooled ADSC 700 with immersion, the liquid-cooled ADSC 700 having the enclosure assembly, according to some embodiments of the disclosure. FIG. 8 illustrates a front view of liquid-cooled ADSC 600 or 700 with cold plates or with immersion, according to some embodiments of the disclosure. In FIGS. 6-8, some elements of ADSC 600 or 700 may be transparent so that the viewer can see-through the ADSC 600 or 700 or allow certain elements of ADSC 600 or 700 to be exposed. Components in FIGS. 6-8 that are similar or same to components illustrated in FIGS. 3-5 are labeled with the same reference numerals and share the same aspects as described in FIGS. 3-5.

In the examples illustrated in FIGS. 6-8, the liquid-cooled ADSC 600 or 700 may include three printed circuit boards, each having semiconductor chips mounted thereon. Aspects of the enclosure assembly are described in relation to one of the printed circuit boards and semiconductor chips mounted thereon (some details may be omitted for brevity and readability). It is envisioned by the disclosure that the aspects of the enclosure assembly may be applied and replicated to one or more printed circuit boards in ADSC 600 or 700. It is also envisioned by the disclosure that not all high power semiconductor chips illustrated are liquid-cooled (they may be air-cooled). In some embodiments, all high power density semiconductor chips are all liquid-cooled.

In FIGS. 6 and 8, high power density semiconductor chip 310 may be liquid-cooled with cold plate 620. Cold plate 620 may be made from aluminum or copper. Cold plate 620 may have internal structures such as tubes or channels that allow a coolant (e.g., precision liquid) to flow through the tubes to conduct and carry heat out of cold plate 620. The tubes or channels may follow a serpentine-like pattern or spiral pattern in the x and y directions across the top of high power density semiconductor chip 310. Cold coolant may be pumped into cold plate 620 (e.g., the tubes or channels) via inlet 632. Warm coolant (after conducting heat from the high power density semiconductor chip 310 through the tubes or channels) may be pumped out of cold plate 620 via outlet 630. Heat exchanger 602 (e.g., coolant manifold) may be provided to pump cold coolant into inlet 632 and receive warm coolant from outlet 630. Heat exchanger 602 may remove heat from hot coolant to generate cold coolant so that cold coolant may be recirculated and used again to cool high power density semiconductor chip 310.

In FIGS. 7 and 8, high power density semiconductor chip 310 may be liquid-cooled with immersion cooling module 752. Immersion cooling module 752 can form a (liquid-tight) sealed enclosure over high power density semiconductor chip 310. Internal space 750 in immersion cooling module 752 may be filled with coolant (e.g., precision liquid) to immerse high power density semiconductor chip 310 with coolant. Cold coolant may be pumped into internal space 750 via inlet 632. Warm coolant (after conducting heat from the high power density semiconductor chip 310 in internal space 750) may be pumped out of internal space 750 via outlet 630. Heat exchanger 602 (e.g., coolant manifold) may be provided to pump cold coolant into inlet 632 and receive warm coolant from outlet 630. Heat exchanger 602 may remove heat from hot coolant to generate cold coolant so that cold coolant may be recirculated and used again to cool high power density semiconductor chip 310.

In FIG. 8, air pathways of air guidance plate 340 may be designed to circumvent or avoid cold plate 620 and/or immersion cooling module 752. Air pathways of air guidance plate 340 may be designed to circumvent or avoid inlet 632 and/or outlet 630. As illustrated, air does not flow over cold plate 620 and/or immersion cooling module 752. Rather, air flows over other regions across printed circuit board 302 to cool other components such as low-medium power density semiconductor chips (e.g., low-medium power density semiconductor chip 312). Air pathways in air guidance plate 340 may be designed to suit a variety of printed circuit board assembly designs and complement liquid-cooling mechanisms if provided. The air pathways in air guidance plate 340 for ADSC 600 or 700 may be implemented in a manner similar to, and/or share the same aspects as, air pathways described with FIGS. 3-5.

Exemplary Intake Subassembly and Hollow Structure of Air Guidance Plate

Figure 9:
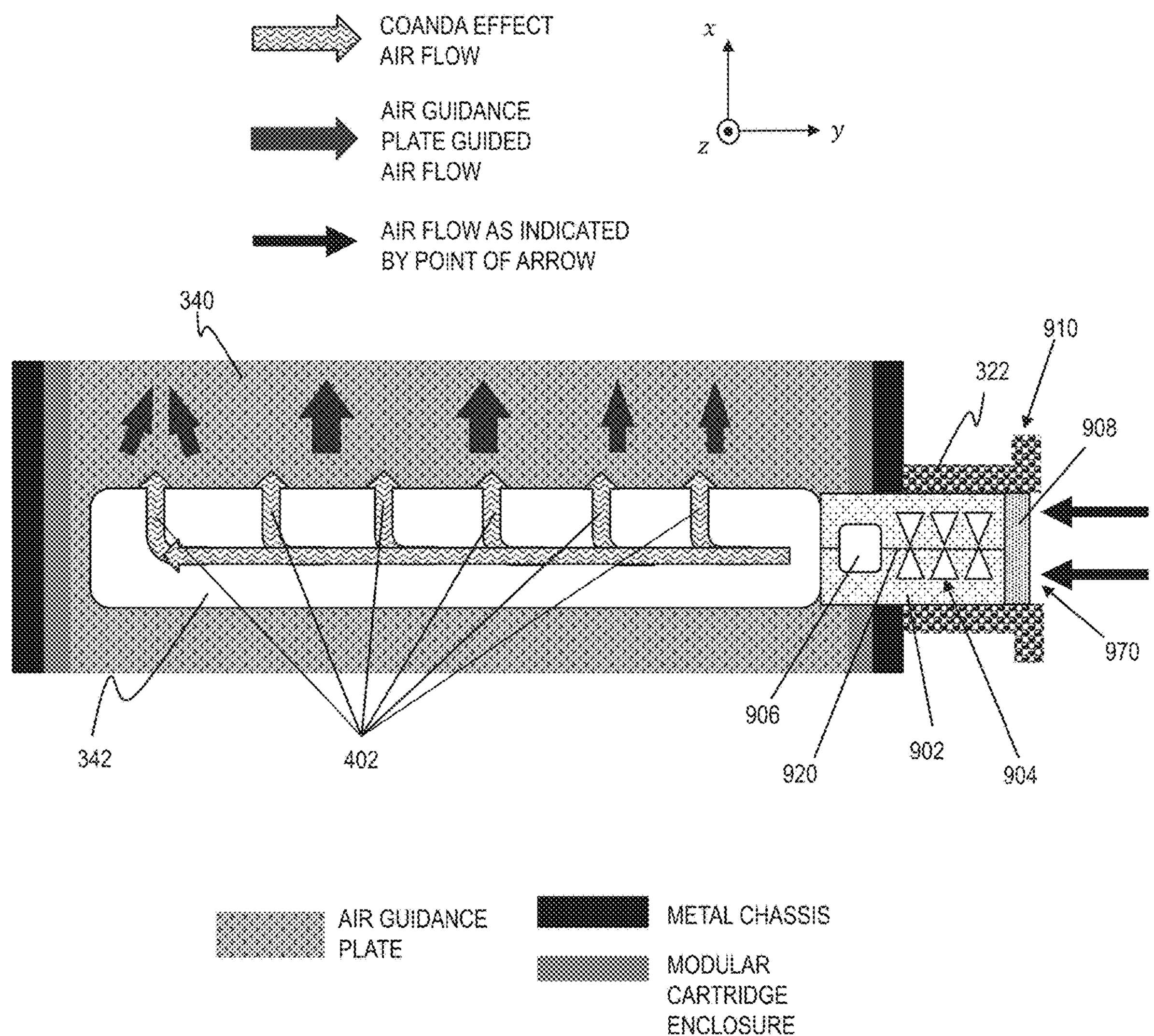
FIG. 9 illustrates an exemplary intake subassembly and hollow structure of the air guidance plate, according to some embodiments of the disclosure.

FIG. 9 illustrates exemplary intake subassembly 322 and hollow structure 342 of the air guidance plate, according to some embodiments of the disclosure. Intake subassembly 322 may include first housing 902, first impeller 904 (e.g., jet impeller having one or more rows of fans/blades that can be stacked in the y direction), and a first (electric) motor 906 that rotates the first impeller 904 axially). The first housing 902 may enclose or encircle the first impeller 904 and the first motor 906. First housing 902 may be cylindrical. The first impeller 904 may have a shaft 920 extending in the y direction and the first motor 906 may rotate the shaft 920 to rotate the first impeller. As illustrated, intake subassembly 322, when the first motor is turned on 906, can push air from outside of the ADSC and into the ADSC in the −y direction. Due to the small form factor design of intake subassembly 322, the first motor 906 may be able to rotate first impeller 904 at a relatively high number of rotations per second without requiring high amounts of power, while creating a high amount of mass air flow through the first housing 902. More rows of fans may be stacked to form first impeller 904 to create a higher amount of mass air flow, if desired.

In some embodiments, the intake subassembly 322 includes a dust and particulate filter 908 at the opening 970 of intake subassembly 322. Dust and particulate filter 908 may prevent ingress of dust and/or particulate into the ADSC, which can cause damage to components of ADSC. Ingress of dust and/or particulates (causing an accumulation of dust and/or particulates) may potentially clog hollow structure 342 and/or air pathways in air guidance plate 340, which can impact the enclosure assembly's ability to cool components in the ADSC. Ingress of dust and/or particulate may leave dust and/or particulate on first impeller 904 or clog interior space of first housing 902, which can impact the ability of first impeller 904 to push air into the ADSC, which in turn can impact the enclosure assembly's ability to cool components in the ADSC.

In some embodiments, the intake subassembly 322 may include collar 910 at the opening 970 of the intake subassembly 322. Collar 910 may be a vertical drip protecting collar. Collar 910 may protect from water (or other fluid) dripping vertically onto ADSC and entering/falling into intake subassembly 322. Water (or other fluid) dripping vertically would be directed or diverted away by collar 910 from the opening 970 or prevented from rolling over the opening 970 and into the intake subassembly 322. Collar 910 may enable the ADSC to pass stringent compliance testing in the automotive or aerospace domains, such as the IP5K2 water test.

Intake subassembly 322 may be manufactured separately from the rest of the ADSC, and later assembled onto the metal chassis. In some cases, the intake subassembly 322 may include a threaded mechanism, and the intake subassembly 322 may be twisted onto the metal chassis through the threaded mechanism. In some cases, the intake subassembly 322 is affixed onto the metal chassis using one or more fasteners. In some cases, the intake subassembly 322 is affixed onto the metal chassis using an adhesive. In some cases, the intake subassembly 322 is affixed onto the metal chassis using a snap fitting/locking mechanism.

Exemplary Exhaust Subassembly and Hollow Structure of Air Guidance Plate

Figure 10:
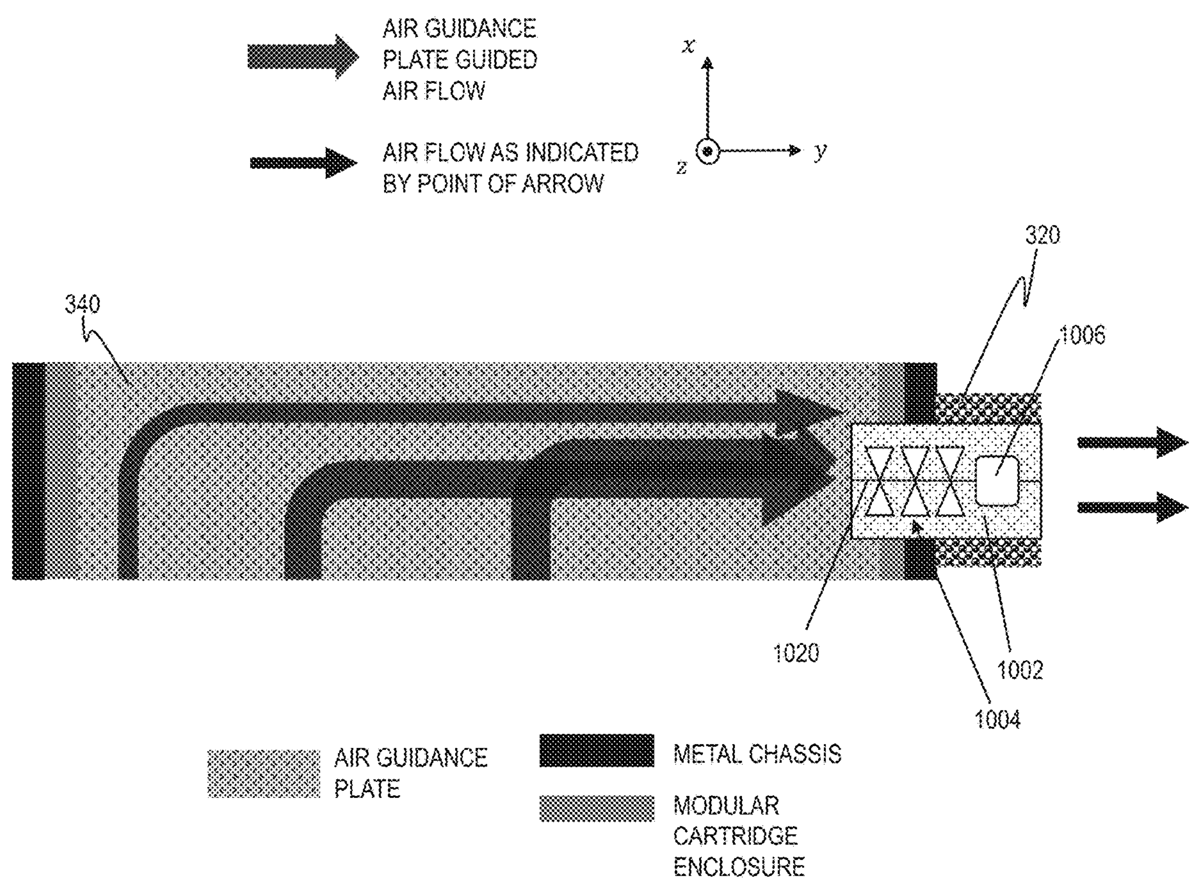
FIG. 10 illustrates an exemplary exhaust subassembly and the air guidance plate, according to some embodiments of the disclosure.

FIG. 10 illustrates an exemplary exhaust subassembly and the air guidance plate, according to some embodiments of the disclosure. Exhaust subassembly 320 may include second housing 1002, second impeller 1004 (e.g., jet impeller having one or more rows of fans/blades that can be stacked in the y direction), and second (electric) motor 1006 that rotates the second impeller axially). The second housing 1002 may enclose or encircle the second impeller 1004 and the second motor 1006. Second housing 1002 may be cylindrical. The second impeller may have a shaft 1020 extending in the y direction and the second motor 1006 may rotate the shaft 1020 to rotate the second impeller 1004. As illustrated, exhaust subassembly 320, when the second motor 1006 is turned on, can push air from inside of the ADSC and out of the ADSC in the +y direction. Due to the small form factor design of exhaust subassembly 320, the second motor 1006 may be able to rotate second impeller 1004 at a relatively high number of rotations per second without requiring high amounts of power, while creating a high amount of mass air flow through the second housing 1002. More rows of fans/blades may be stacked to form second impeller 1004 to create a higher amount of mass air flow, if desired.

Exhaust subassembly 320 may be manufactured separately from the rest of the ADSC, and later assembled onto the metal chassis. In some cases, the exhaust subassembly 320 may include a threaded mechanism, and the exhaust subassembly 320 may be twisted onto the metal chassis through the threaded mechanism. In some cases, the exhaust subassembly 320 is affixed onto the metal chassis using one or more fasteners. In some cases, exhaust subassembly 320 is affixed onto the metal chassis using an adhesive. In some cases, the exhaust subassembly 320 is affixed onto the metal chassis using a snap fitting/locking mechanism.

Exemplary Hollow Structures of Air Guidance Plate

As illustrated through FIGS. 3-9, air guidance plate 340 has hollow structure 342 at a first end 350 of air guidance plate 340 that takes air from the intake subassembly 322 and carries the air in the −y direction into the ADSC through one or more main air channels. Hollow structure 342 also leverages the Coanda effect through implementation of exhaust slots 402 that can direct the air in the main air channel(s) out of the hollow structure 342 and in the x direction. Effectively the hollow structure 342 directs air and bends the direction of flow by 90 degrees in a compact area and pushes air out of the hollow structure 342 in an efficient manner by leveraging the Coanda effect on the inner surfaces of provided by the hollow structure 342 (e.g., inner surfaces forming the main air channel(s) and the exhaust slots 402).

Figure 11:
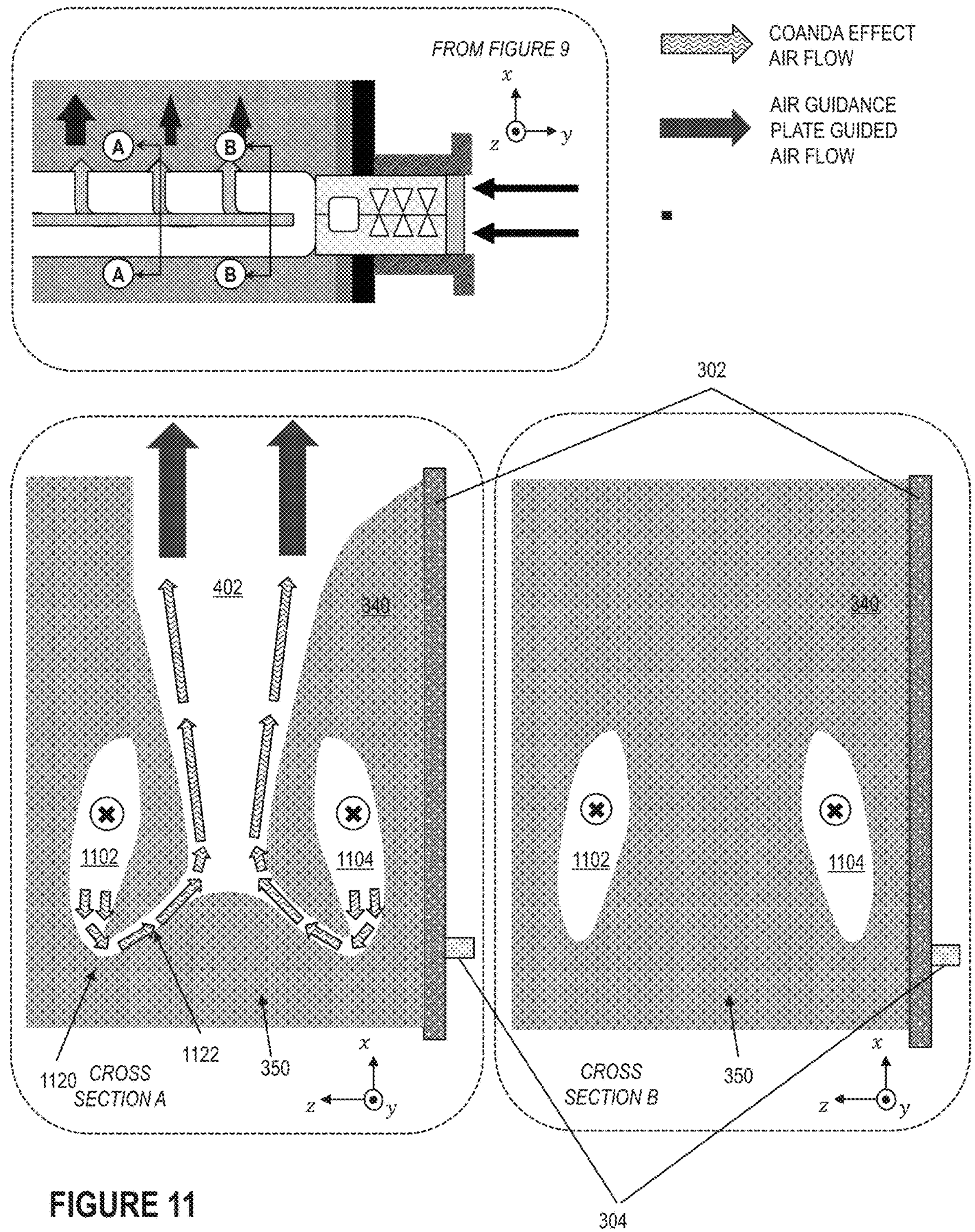
FIG. 11 illustrates cross-sectional views of an exemplary hollow structure, according to some embodiments of the disclosure.
Figure 12:
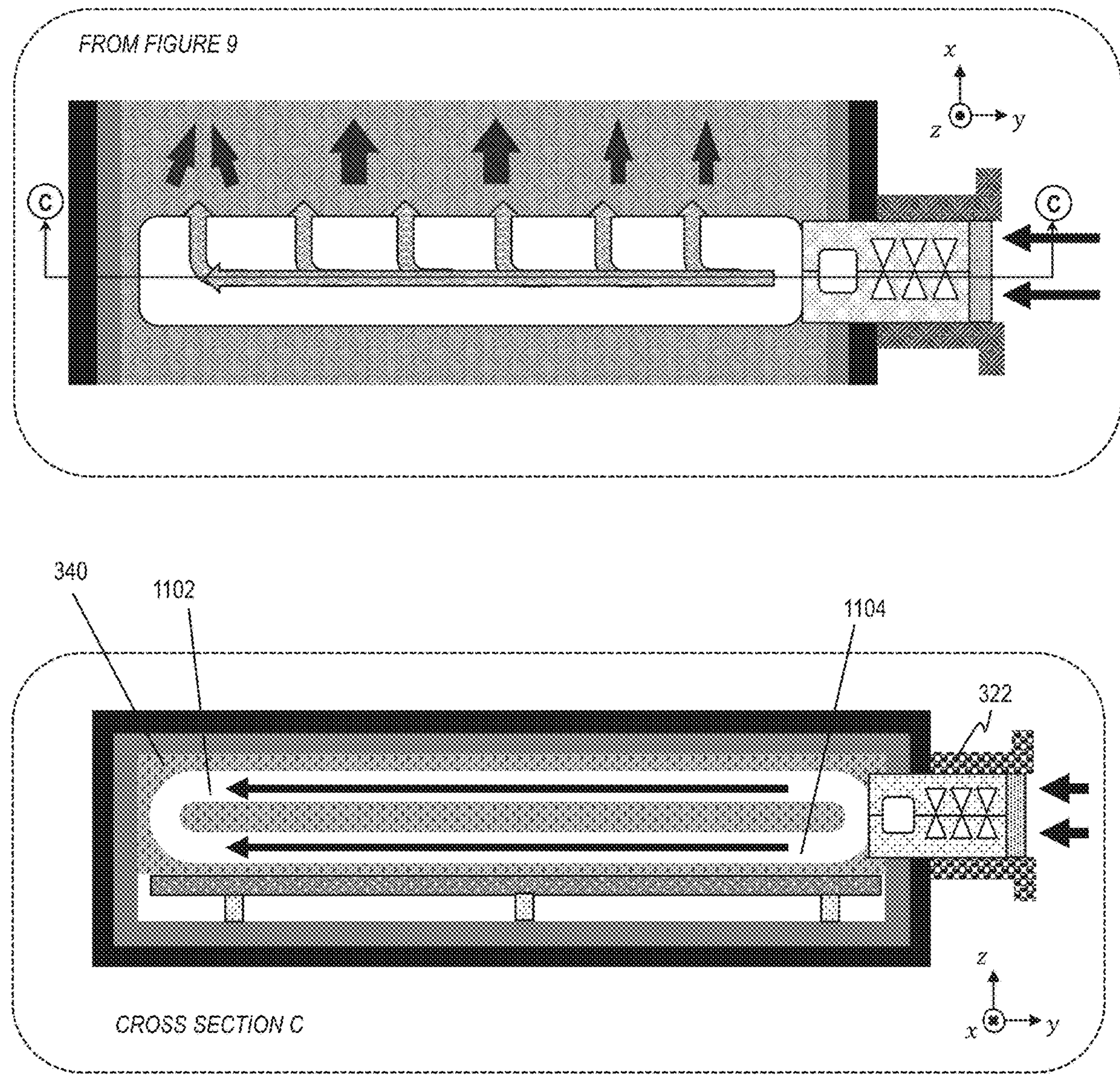
FIG. 12 illustrates a cross-sectional view of an exemplary hollow structure, according to some embodiments of the disclosure.
Figure 13:
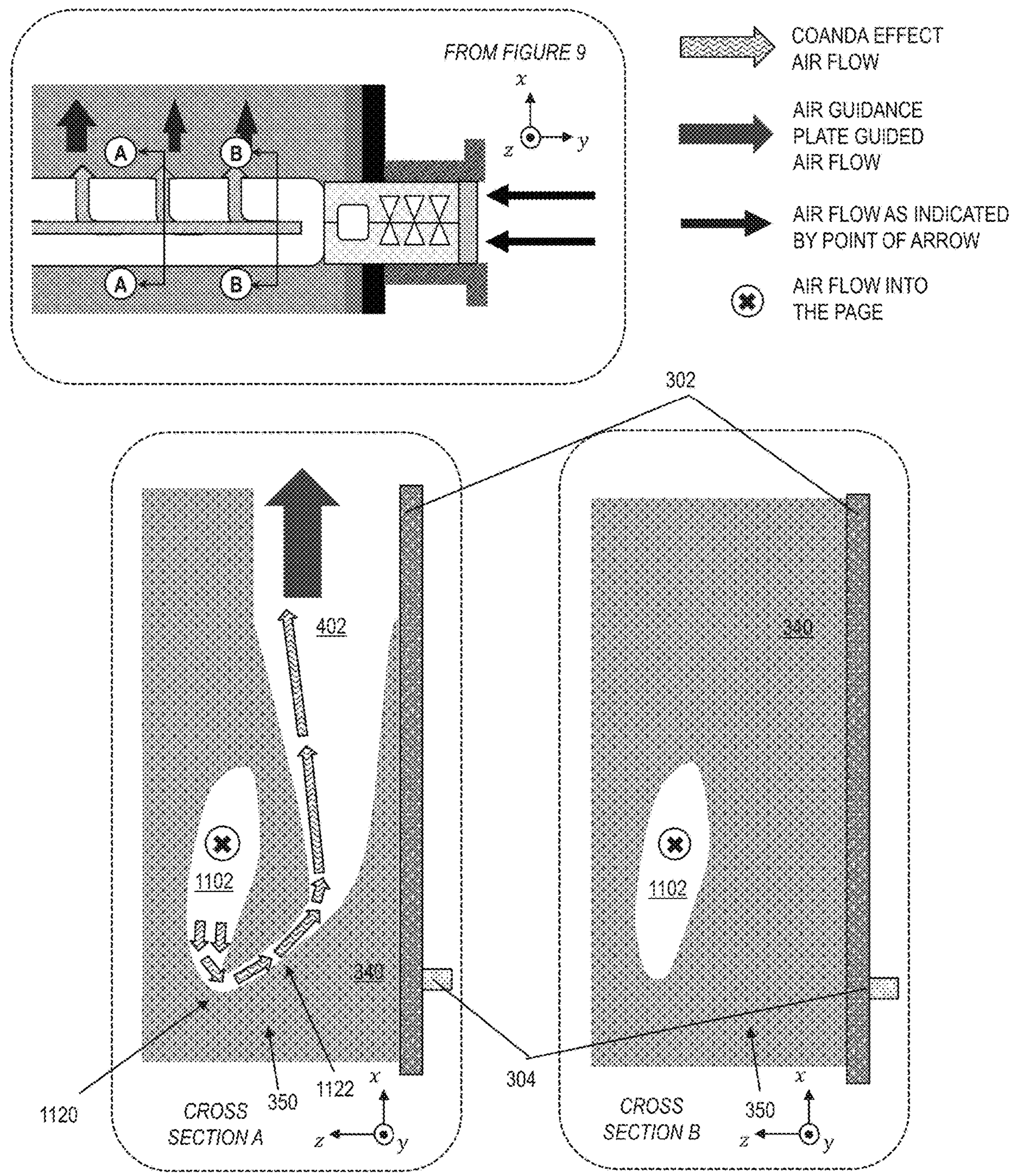
FIG. 13 illustrates cross-sectional views of a further exemplary hollow structure, according to some embodiments of the disclosure.
Figure 14:
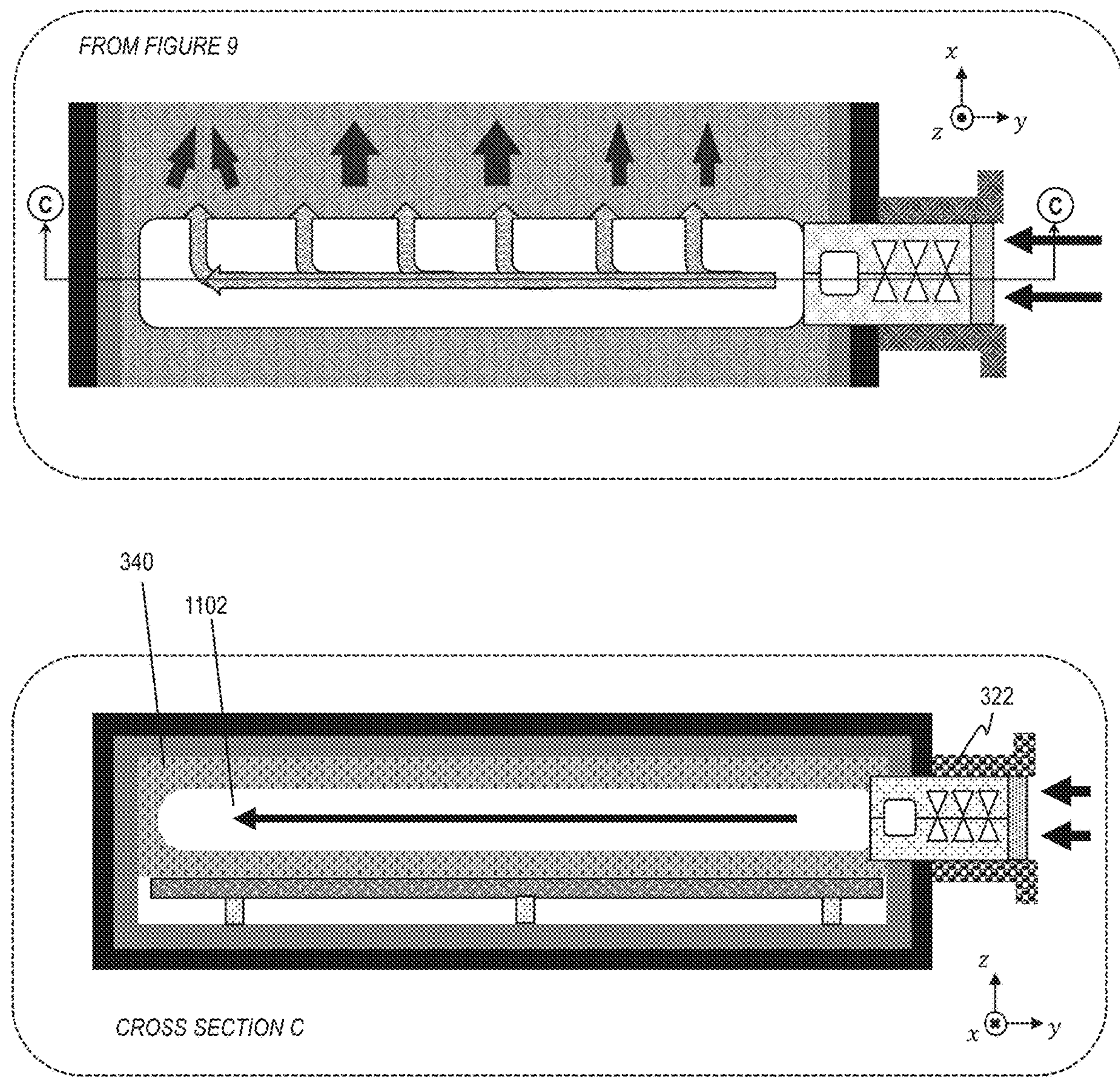
FIG. 14 illustrates a cross-sectional view of a further exemplary hollow structure, according to some embodiments of the disclosure.

Depending on the allowance in the z direction, two or more main air channels may be stacked over one another in the z direction, as illustrated in FIGS. 11 and 12. If desired, one main air channel may be provided, as illustrated in FIGS. 13 and 14.

FIG. 11 illustrates cross-sectional view A and cross-sectional view B of one embodiment of exemplary hollow structure 342, according to some embodiments of the disclosure. FIG. 12 illustrates cross-sectional view C of one embodiment exemplary hollow structure 342, according to some embodiments of the disclosure. In FIGS. 11 and 12, hollow structure 342 may include two main air channels: first air channel 1102 and second air channel 1104. The air may flow into the page in the −y direction through the two main air channels. The main air channels may be oblong-shaped. Exhaust slots may extend in the +x direction from the main air channels.

Cross section A illustrates a location with an exhaust slot 402, where a fold 1120 moving air in the −x direction and narrowing channel 1122 directing air from fold 1120 in the +x direction may be provided with first air channel 1102 of the hollow structure 342 to form the exhaust slot 402. A similar fold and narrowing channel may be provided with second air channel 1104 in the same location to form the exhaust slot 402. Leveraging the Coanda effect, fold 1120 and the narrowing channel 1122 may have smooth curved surfaces to guide and direct air out of first air channel 1102 and through exhaust slot 402. Having two narrowing channels in the same location may create a joining effect for the air flowing out of the two narrowing channels.

In some embodiments, narrowing channels extending from the first air channel 1102 may be located in the same positions as the narrowing channels extending from the second air channel 1104. Collocating the narrowing channels for both the first air channel 1102 and the second air channel 1104 may create a joining effect of the air flowing out of the collocated exhaust slots. The ensemble of the first air channel 1102 and corresponding narrowing channels and the other ensemble of the second air channel 1104 and corresponding narrowing channels may mirror each other on a plane that is formed in the x and y direction (e.g., parallel to the printed circuit board 302). In some embodiments, narrowing channels extending from the first air channel 1102 may be located in different positions as the narrowing channels extending from the second air channel 1104.

FIG. 13 illustrates cross-sectional view A and cross-sectional view B of a further embodiment of exemplary hollow structure 342, according to some embodiments of the disclosure. FIG. 14 illustrates cross-sectional view C of a further embodiment of an exemplary hollow structure 342 according to some embodiments of the disclosure. Illustrations in FIGS. 13-14 are similar to the embodiment shown in FIGS. 11-12 with the exception that the second main air channel 1104 is omitted.

Exemplary ADSC Mounting Configurations and Compliance-Related Features

Figure 15:
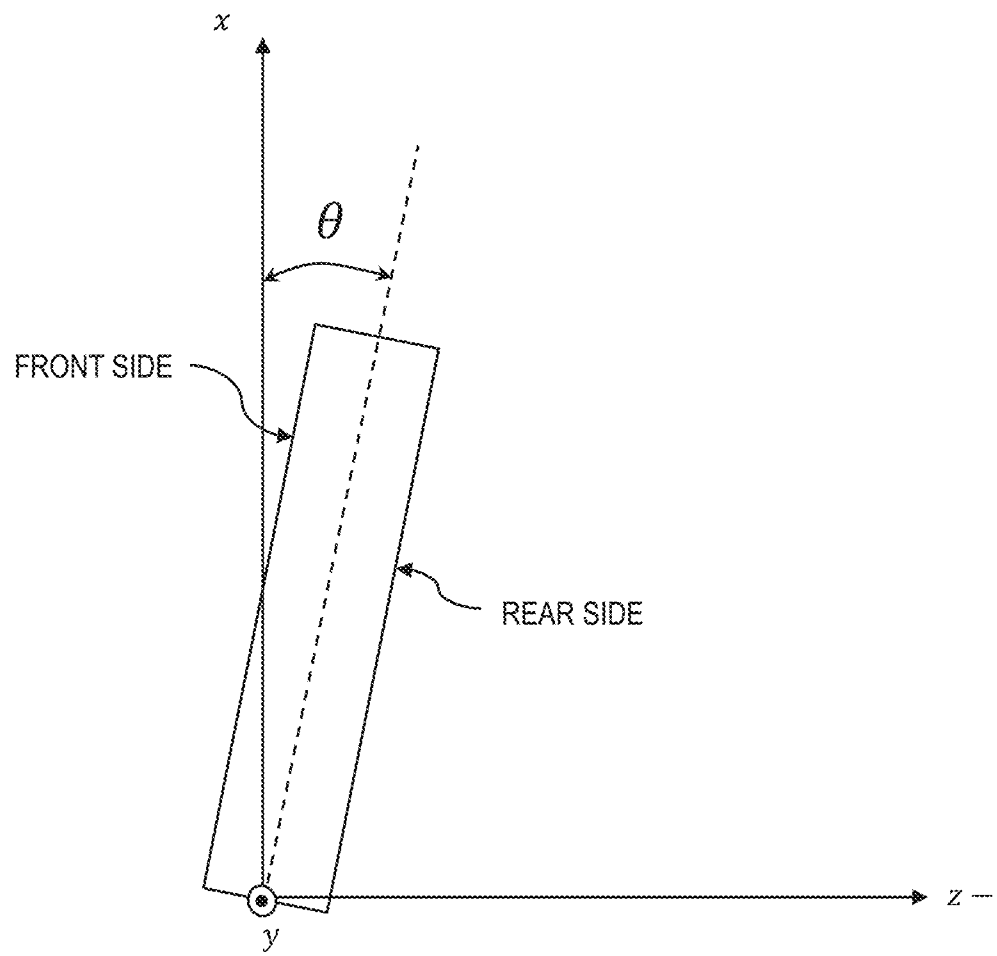
FIG. 15 illustrates a tilting angle of the autonomous driving computing system when mounted in an autonomous vehicle, according to some embodiments of the disclosure.

FIG. 15 illustrates a tilting angle θ of the ADSC when mounted in an autonomous vehicle, according to some embodiments of the disclosure. In some cases, the tiling angle θ may be between 10 degrees to 30 degrees. The tiling angle θ may be approximately 25 degrees. Tiling angle θ may be taken into account to ensure that mechanisms to prevent vertical water drip may operate even when the ADSC tilts by tilting angle θ when mounted in the vehicle.

Figure 16:
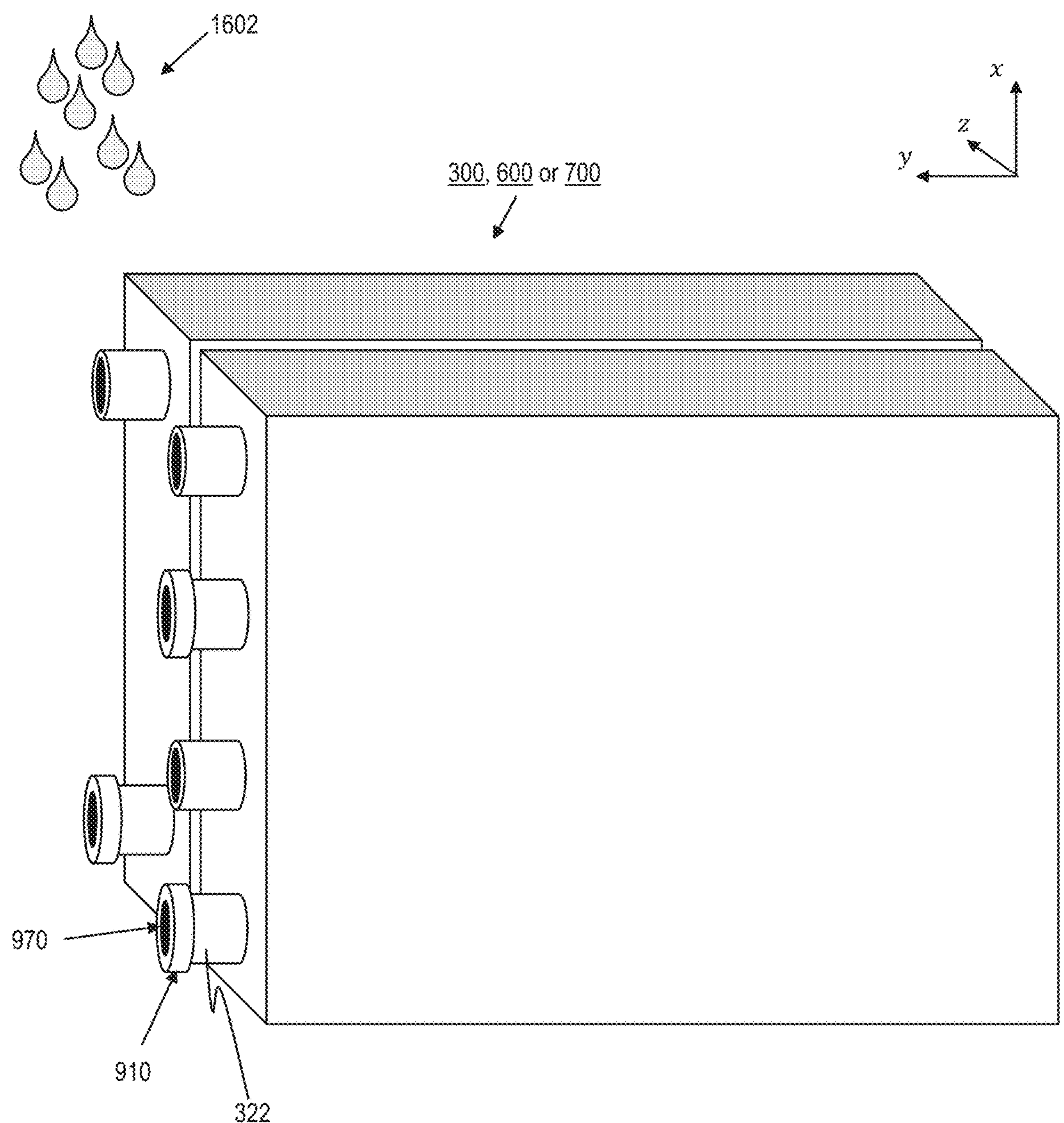
FIG. 16 illustrates vertical drip protection offered by collars of the intake subassemblies, according to some embodiments of the disclosure.

FIG. 16 illustrates vertical drip protection offered by collars of the intake subassemblies, according to some embodiments of the disclosure. As shown, collar 910 for intake subassembly 322 is circular and surrounds opening 970. Even if the ADSC 300, 600, or 700 is tilted as illustrated in FIG. 15, the opening 970 is protected from vertical drip 1602 since collar 910 can divert water (or other fluid) from opening 970 effectively. Collar 910 may enable the ADSC to pass the IP5K2 water test.

Exemplary AV Management System

Figure 17:
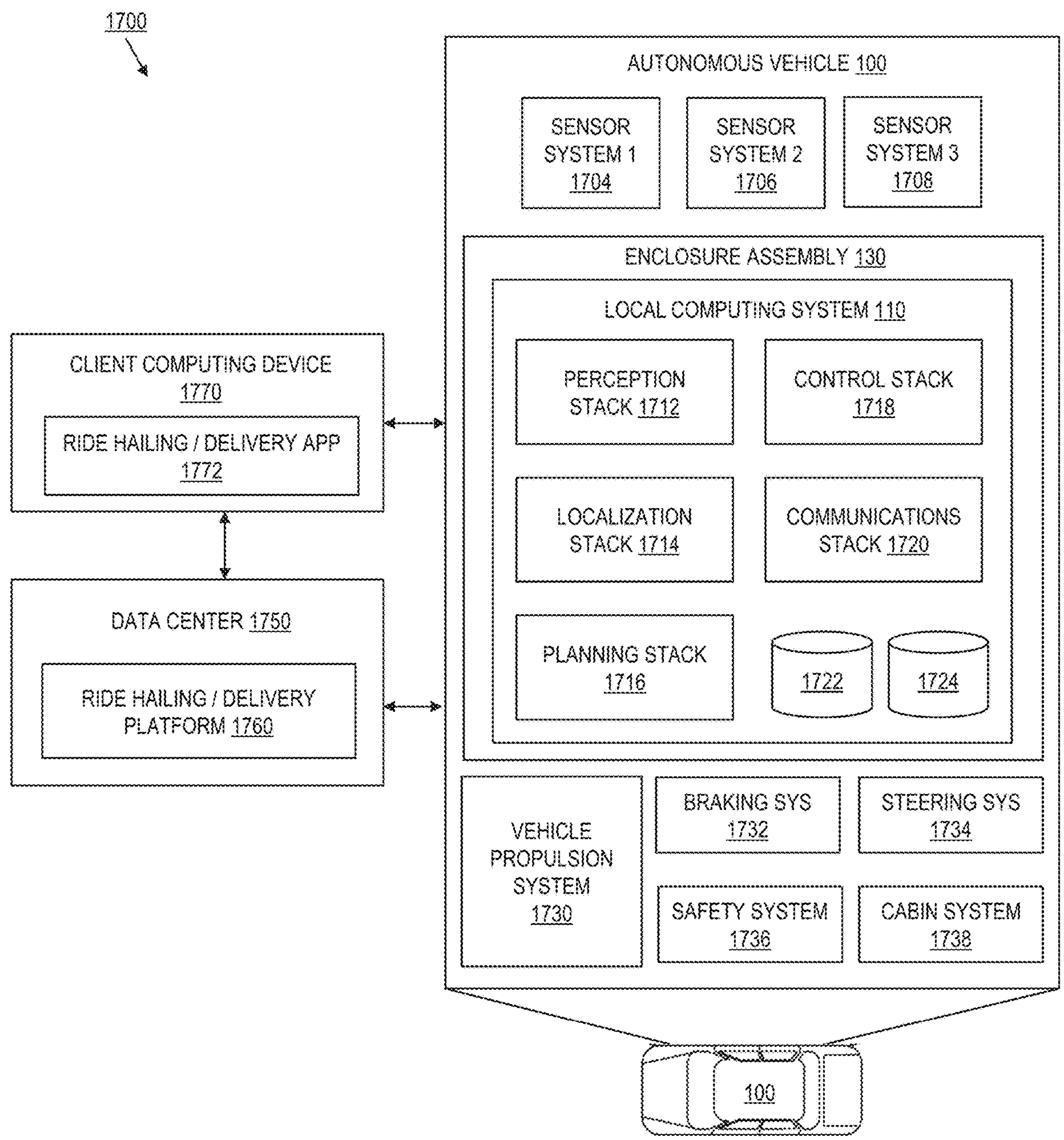
FIG. 17 illustrates an exemplary system environment that can be used to facilitate autonomous vehicle dispatch and operations, according to some embodiments of the disclosure.

FIG. 17 illustrates an exemplary AV management system 1700 environment that can be used to facilitate autonomous vehicle dispatch and operations in providing AV-enabled services, according to some embodiments of the disclosure. In this example, the AV management system 1700 includes an AV 100, a data center 1750, and a client computing device 1770. The AV 100, the data center 1750, and the client computing device 1770 can communicate with one another over one or more networks (not shown).

AV 100 can navigate roadways without a human driver based on sensor signals generated by multiple sensor systems 1704, 1706, and 1708 (or referred to as sensors herein, such as one or more sensors 120). The sensor systems 1704-1708 can include different types of sensors and can be arranged about the AV 100. For instance, the sensor systems 1704-1708 can comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1704 can be a camera system, the sensor system 1706 can be a LIDAR system, and the sensor system 1708 can be a RADAR system. Other embodiments may include any other number and type of sensors.

AV 100 can also include several mechanical and electrical systems (or referred to as vehicle controls herein, such as vehicle controls 180) that can be used to maneuver or operate AV 100. For instance, the mechanical and electrical systems can include vehicle propulsion system 1730, braking system 1732, steering system 1734, safety system 1736, and cabin system 1738, among other systems. The systems can include vehicle signal lights and vehicle horn. Vehicle propulsion system 1730 can include an electric motor, an internal combustion engine, or both. The braking system 1732 can include an engine brake, a wheel braking system (e.g., a disc braking system that utilizes brake pads), hydraulics, actuators, and/or any other suitable componentry configured to assist in decelerating AV 100. The steering system 1734 can include suitable componentry configured to control the direction of movement of the AV 100 during navigation. Safety system 1736 can include lights and signal indicators, a parking brake, airbags, and so forth. The cabin system 1738 can include cabin temperature control systems, in-cabin entertainment systems, and so forth. In some embodiments, the AV 100 may not include human driver actuators (e.g., steering wheel, handbrake, foot brake pedal, foot accelerator pedal, turn signal lever, window wipers, etc.) for controlling the AV 100. Instead, the cabin system 1738 can include one or more client interfaces (e.g., Graphical User Interfaces (GUIs), Voice User Interfaces (VUIs), etc.) for controlling certain aspects of the mechanical systems 1730-1738.

AV 100 can additionally include a local computing system 110 (an example of an autonomous driving computing system described herein) that is in communication with the sensor systems 1704-1708, the mechanical systems 1730-1738, the data center 1750, and the client computing device 1770, among other systems. The local computing system 110 can include one or more processors (e.g., semiconductor chips) and memory, including instructions that can be executed by the one or more processors. The instructions can make up one or more software stacks or components responsible for controlling the AV 100; communicating with the data center 1750, the client computing device 1770, and other systems; receiving inputs from riders, passengers, and other entities within the AV's environment; logging metrics collected by the sensor systems 1704-1708; and so forth. In this example, the local computing system 110 includes a perception stack 1712, a mapping and localization stack 1714, a planning stack 1716, a control stack 1718, a communications stack 1720, a High Definition (HD) geospatial database 1722, and an AV operational database 1724, among other stacks and systems. Local computing system 110 be enclosed by enclosure assembly 130.

Perception stack 1712 can enable the AV 100 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1704-1708, the mapping and localization stack 1714, the HD geospatial database 1722, other components of the AV, and other data sources (e.g., the data center 1750, the client computing device 1770, third-party data sources, etc.). The perception stack 1712 can detect and classify objects and determine their current and predicted locations, speeds, directions, and the like. In addition, the perception stack 1712 can determine the free space around the AV 100 (e.g., to maintain a safe distance from other objects, change lanes, park the AV, etc.). The perception stack 1712 can also identify environmental uncertainties, such as where to look for moving objects, flag areas that may be obscured or blocked from view, and so forth.

Mapping and localization stack 1714 can determine the AV's position and orientation (pose) using different methods from multiple systems (e.g., GPS, IMUs, cameras, LIDAR, RADAR, ultrasonic sensors, the HD geospatial database 1722, etc.). For example, in some embodiments, the AV 100 can compare sensor data captured in real-time by the sensor systems 1704-1708 to data in the HD geospatial database 1722 to determine its precise (e.g., accurate to the order of a few centimeters or less) position and orientation. The AV 100 can focus its search based on sensor data from one or more first sensor systems (e.g., GPS) by matching sensor data from one or more second sensor systems (e.g., LIDAR). If the mapping and localization information from one system is unavailable, the AV 100 can use mapping and localization information from a redundant system and/or from remote data sources.

The planning stack 1716 can determine how to maneuver or operate the AV 100 safely and efficiently in its environment. Planning stack 1716 can generate and output path data and/or driving maneuver data of the AV 100. For example, the planning stack 1716 can receive the location, speed, and direction of the AV 100, geospatial data, data regarding objects sharing the road with the AV 100 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 100 from one point to another. The planning stack 1716 can determine multiple sets of one or more mechanical operations that the AV 100 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events.

The control stack 1718 can manage the operation of the vehicle propulsion system 1730, the braking system 1732, the steering system 1734, the safety system 1736, and the cabin system 1738. The control stack 1718 can receive sensor signals from the sensor systems 1704-1708 as well as communicate with other stacks or components of the local computing system 110 or a remote system (e.g., the data center 1750) to effectuate operation of the AV 100. For example, the control stack 1718 can implement the final path or actions from the multiple paths or actions provided by the planning stack 1716. This can involve turning the routes and decisions from the planning stack 1716 into commands for the actuators that control the AV's steering, throttle, brake, and drive unit.

The communication stack 1720 can transmit and receive signals between the various stacks and other components of the AV 100 and between the AV 100, the data center 1750, the client computing device 1770, and other remote systems. The communication stack 1720 can enable the local computing system 110 to exchange information remotely over a network.

The HD geospatial database 1722 can store HD maps and related data of the streets upon which the AV 100 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 1724 can store raw AV data generated by the sensor systems 1704-1708 and other components of the AV 100 and/or data received by the AV 100 from remote systems (e.g., the data center 1750, the client computing device 1770, etc.). In some embodiments, the raw AV data can include HD LIDAR point-cloud data, image or video data, RADAR data, GPS data, and other sensor data that the data center 1750 can use for creating or updating AV geospatial data. In some examples, data center 1750 can include user profiles.

Data center 1750 can be a private cloud (e.g., an enterprise network, a co-location provider network, etc.), a public cloud, a hybrid cloud, a multi-cloud, and so forth. Data center 1750 can include one or more computing devices remote to the local computing system 110 for managing a fleet of AVs and AV-related services. For example, in addition to managing the AV 100, the data center 1750 may also support a ride hailing service, a delivery service, a remote/roadside assistance service, street services (e.g., street mapping, street patrol, street cleaning, street metering, parking reservation, etc.), and the like.

The data center 1750 can send and receive various signals to and from the AV 100 and the client computing device 1770. These signals can include sensor data captured by the sensor systems 1704-1708, roadside assistance requests, software updates, ride hailing/delivery pick-up and drop-off instructions, and so forth. In this example, the data center 1705 may include a ride hailing/delivery platform 1760.

The ride hailing/delivery platform 1760 can interact with a customer of a ride hailing/delivery service via a ride hailing/delivery application 1772 executing on the client computing device 1770. If appropriate, ride hailing/delivery platform 1760 may provide user-specified or user-provided preferences to controller 102. The client computing device 1770 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ride hailing/delivery application 1772. The client computing device 1770 can be a customer's mobile computing device, an in-vehicle mobile computing device or a computing device integrated with the AV 100 (e.g., the local computing system 110). The ride hailing/delivery platform 1760 can receive requests to be picked up or dropped off from the ride hailing/delivery application 1772 and dispatch the AV 100 for the trip.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general-purpose or special-purpose computer, including the functional design of any special-purpose processor as described above. By way of example, and not limitation, such tangible computer-readable devices can include storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Select Examples

Example 1 is an in-vehicle computing system enclosure assembly, comprising: air guidance plate disposed over a printed circuit board having one or more semiconductor chips mounted thereon, the air guidance plate including a hollow structure at a first end of the air guidance plate, the hollow structure having a plurality of exhaust slots; an intake subassembly located adjacent to the first end of the air guidance plate, the intake subassembly including a first impeller, and a first motor; and an exhaust subassembly located adjacent to a second end of the air guidance plate, the exhaust subassembly including a second impeller, and a second motor; wherein the hollow structure takes air from the intake subassembly and directs air through the hollow structure and out of the exhaust slots in a first direction towards a second end of the air guidance plate and the exhaust subassembly.

In Example 2, the in-vehicle computing system enclosure assembly of Example 1 can optionally include: the air guidance plate comprising air pathways in a first side of the air guidance plate facing the printed circuit board; and the air pathways being formed by troughs that extend from respective exhaust slots towards the exhaust subassembly.

In Example 3, the in-vehicle computing system enclosure assembly of Example 1 or 2 can optionally include the air guidance plate comprising air pathways; and the air pathways forming a multi-lattice structure that guide air from the exhaust slots towards the exhaust subassembly.

In Example 4, the in-vehicle computing system enclosure assembly of Example 3 can optionally include the multi-lattice structure further directing air towards at least a subset of the one or more semiconductor chips.

In Example 5, the in-vehicle computing system enclosure assembly of Example 3 or 4 can optionally include: the multi-lattice structure further including channels of different widths.

In Example 6, the in-vehicle computing system enclosure assembly of any one of Examples 1-5 can optionally include the one or more semiconductor chips comprising: one or more high power density semiconductor chips.

In Example 7, the in-vehicle computing system enclosure assembly of any one of Examples 1-6 can optionally include the one or more semiconductor chips comprising: one or more low or medium power density semiconductor chips.

In Example 8, the in-vehicle computing system enclosure assembly of any one of Examples 1-7 can optionally include at least one of the one or more semiconductor chips being air-cooled with a heat sink.

In Example 9, the in-vehicle computing system enclosure assembly of any one of Examples 1-8 can optionally include at least one of the one or more semiconductor chips being liquid-cooled with a cold plate.

In Example 10, the in-vehicle computing system enclosure assembly of any one of Examples 1-9 can optionally include at least one of the one or more semiconductor chips is liquid-cooled with immersion.

In Example 11, the in-vehicle computing system enclosure assembly of any one of Examples 1-10 can optionally include: the hollow structure having an oblong-shaped channel extending in a second direction from the intake subassembly, the second direction being perpendicular to the first direction; and the exhaust slots extending from the oblong-shaped channel in the first direction.

In Example 12, the in-vehicle computing system enclosure assembly of Example 11 can optionally include the hollow structure further including: a further oblong-shaped channel extending in the second direction from the intake subassembly; and further exhaust slots extending from the further oblong-shaped channel in the first direction.

In Example 13, the in-vehicle computing system enclosure assembly of example 12 can optionally include the further oblong-shaped channel and the further exhaust slots mirroring the oblong-shaped channel and the exhaust slots on a plane that is parallel to the printed circuit board.

In Example 14, the in-vehicle computing system enclosure assembly of any one of Examples 1-13 can optionally include the exhaust slots being formed with smooth curved channels that direct air out of the hollow structure and towards the first direction.

In Example 15, the in-vehicle computing system enclosure assembly of any one of Examples 1-14 can optionally include the exhaust slots being located near one or more ones of one or more semiconductor chips located near the first end of the air guidance plate.

In Example 16, the in-vehicle computing system enclosure assembly of any one of Examples 1-15 can optionally include the air guidance plate being made from plastic material.

In Example 17, the in-vehicle computing system enclosure assembly of any one of Examples 1-16 can optionally include the air guidance plate being affixed to the printed circuit board using a snapping mechanism.

In Example 18, the in-vehicle computing system enclosure assembly of any one of Examples 1-17 can optionally include the air guidance plate being affixed to the printed circuit board using fasteners.

In Example 19, the in-vehicle computing system enclosure assembly of any one of Examples 1-18 can optionally include a metal chassis enclosing the air guidance plate and the printed circuit board.

In Example 20, the in-vehicle computing system enclosure assembly of Example 19 can optionally include the intake subassembly being twisted onto the metal chassis through a threaded mechanism.

In Example 21, the in-vehicle computing system enclosure assembly of Example 19 or 20 can optionally include the exhaust subassembly being twisted onto the metal chassis through a threaded mechanism.

In Example 22, the in-vehicle computing system enclosure assembly of any one of Examples 19-21 can optionally include the intake subassembly being affixed onto the metal chassis using one or more fasteners.

In Example 23, the in-vehicle computing system enclosure assembly of any one of Examples 19-22 can optionally include the exhaust subassembly being affixed onto the metal chassis using one or more fasteners.

In Example 24, the in-vehicle computing system enclosure assembly of any one of Examples 1-13 can optionally include the intake subassembly comprising a dust and particulate filter.

In Example 25, the in-vehicle computing system enclosure assembly of any one of Examples 1-24 can optionally include the intake subassembly comprising a vertical drip protecting collar.

Example 26 is an autonomous driving computing system, comprising: one or more processors mounted on a printed circuit board; one or more non-transitory computer-readable media storing instructions, that when executed by the one or more processors, cause the one or more processors to generate signals to control an autonomous vehicle; and an enclosure assembly mounted in the autonomous vehicle that encloses the one or more processors and the printed circuit board, the enclosure assembly comprising: an intake subassembly, the intake subassembly including a first impeller, and a first motor; an exhaust subassembly, the exhaust subassembly including a second impeller, and a second motor; and air guidance plate disposed over the printed circuit board, the air guidance plate including: (1) a hollow structure at a first end of the air guidance plate that takes air from the intake subassembly through an oblong-shaped channel and directs the air through a plurality of exhaust slots in a direction that is perpendicular to a length of the oblong-shaped channel; and (2) air pathways that guide the air from the exhaust slots towards a second end of the air guidance plate and the exhaust subassembly.

In Example 27, the autonomous driving computing system of Example 26 can optionally include the enclosure assembly comprising an opening to receive a power connection.

In Example 28, the autonomous driving computing system of Example 26 or 27 can optionally include the enclosure assembly comprises an opening to receive a network connection.

Example 29 is a vehicle, comprising: sensors to sense an environment of the vehicle; vehicle controls; a driving computing system to control the vehicle controls based on data from the sensors, the driving computing system comprising: one or more semiconductor chips mounted on a printed circuit board; and an enclosure assembly mounted in the vehicle that encloses the one or more semiconductor chips and printed circuit board, the enclosure assembly comprising: an intake subassembly, the intake subassembly including a first impeller, and a first motor; an exhaust subassembly, the exhaust subassembly including a second impeller, and a second motor; and air guidance plate disposed over the printed circuit board, the air guidance plate including (1) a hollow structure at a first end of the air guidance plate that takes air from the intake subassembly, the hollow structure having a plurality of exhaust slots, and (2) air pathways that guide the air from the exhaust slots towards a second end of the air guidance plate and the exhaust subassembly.

In Example 30, the vehicle of Example 29 can optionally include the driving computing system being mounted in the vehicle at a tilt angle between 10 degrees to 30 degrees.

In Example 31, the vehicle of Example 29 or 30 can optionally include the enclosure assembly being mounted in the vehicle in an orientation where the second end of the air guidance plate is located vertically higher than the first end of the air guidance plate.

In Example 32, the vehicle of any one of Examples 29-31 can optionally include the enclosure assembly comprising an opening to receive a power connection.

In Example 33, the vehicle of any one of Examples 29-32 can optionally include the enclosure assembly comprising an opening to receive a network connection that communicably connects the driving computing system to the sensors and the vehicle controls.

Any one of the features in Examples 2-25 may be optionally added to any one of Examples 22-33.

What is claimed is:

1. An in-vehicle computing system enclosure assembly, comprising:

air guidance plate disposed over a printed circuit board having one or more semiconductor chips mounted thereon, the air guidance plate including a hollow structure at a first end of the air guidance plate, the hollow structure having a plurality of exhaust slots;

an intake subassembly located adjacent to the first end of the air guidance plate, the intake subassembly including a first impeller, and a first motor; and an exhaust subassembly located adjacent to a second end of the air guidance plate, the exhaust subassembly including a second impeller, and a second motor;

wherein the hollow structure takes air from the intake subassembly and directs air through the hollow structure and out of the exhaust slots in a first direction towards a second end of the air guidance plate and the exhaust subassembly.

2. The in-vehicle computing system enclosure assembly of claim 1, wherein:

the air guidance plate comprises air pathways in a first side of the air guidance plate facing the printed circuit board; and the air pathways are formed by troughs that extend from respective exhaust slots towards the exhaust subassembly.

3. The in-vehicle computing system enclosure assembly of claim 1, wherein:

the air guidance plate comprises air pathways; and the air pathways form a multi-lattice structure that guide air from the exhaust slots towards the exhaust subassembly.

4. The in-vehicle computing system enclosure assembly of claim 3, wherein:

the multi-lattice structure further directs air towards at least a subset of the one or more semiconductor chips.

5. The in-vehicle computing system enclosure assembly of claim 3, wherein:

the multi-lattice structure further includes channels of different widths.

6. The in-vehicle computing system enclosure assembly of claim 1, wherein:

the hollow structure has an oblong-shaped channel extending in a second direction from the intake subassembly, the second direction being perpendicular to the first direction; and the exhaust slots extend from the oblong-shaped channel in the first direction.

7. The in-vehicle computing system enclosure assembly of claim 6, wherein the hollow structure further includes:

a further oblong-shaped channel extending in the second direction from the intake subassembly; and further exhaust slots extending from the further oblong-shaped channel in the first direction.

8. The in-vehicle computing system enclosure assembly of claim 7, wherein the further oblong-shaped channel and the further exhaust slots mirror the oblong-shaped channel and the exhaust slots on a plane that is parallel to the printed circuit board.

9. The in-vehicle computing system enclosure assembly of claim 1, wherein:

the exhaust slots are formed with smooth curved channels that direct air out of the hollow structure and towards the first direction.

10. The in-vehicle computing system enclosure assembly of claim 1, wherein:

the exhaust slots are located near one or more ones of one or more semiconductor chips located near the first end of the air guidance plate.

11. The in-vehicle computing system enclosure assembly of claim 1, wherein:

the air guidance plate is made from plastic material.

12. The in-vehicle computing system enclosure assembly of claim 1, wherein:

the air guidance plate is affixed to the printed circuit board using a snapping mechanism.

13. The in-vehicle computing system enclosure assembly of claim 1, wherein:

the air guidance plate is affixed to the printed circuit board using fasteners.

14. The in-vehicle computing system enclosure assembly of claim 1, further comprising:

a metal chassis enclosing the air guidance plate and the printed circuit board.

15. The in-vehicle computing system enclosure assembly of claim 1, wherein the intake subassembly comprises a dust and particulate filter.

16. The in-vehicle computing system enclosure assembly of claim 1, wherein the intake subassembly comprises a vertical drip protecting collar.

17. An autonomous driving computing system, comprising:

one or more processors mounted on a printed circuit board;

one or more non-transitory computer-readable media storing instructions, that when executed by the one or more processors, cause the one or more processors to generate signals to control an autonomous vehicle; and an enclosure assembly mounted in the autonomous vehicle that encloses the one or more processors and the printed circuit board, the enclosure assembly comprising:

an intake subassembly, the intake subassembly including a first impeller, and a first motor;

an exhaust subassembly, the exhaust subassembly including a second impeller, and a second motor; and air guidance plate disposed over the printed circuit board, the air guidance plate including: (1) a hollow structure at a first end of the air guidance plate that takes air from the intake subassembly through an oblong-shaped channel and directs the air through a plurality of exhaust slots in a direction that is perpendicular to a length of the oblong-shaped channel; and (2) air pathways that guide the air from the exhaust slots towards a second end of the air guidance plate and the exhaust subassembly.

18. A vehicle, comprising:

sensors to sense an environment of the vehicle;

vehicle controls;

a driving computing system to control the vehicle controls based on data from the sensors, the driving computing system comprising:

one or more semiconductor chips mounted on a printed circuit board; and an enclosure assembly mounted in the vehicle that encloses the one or more semiconductor chips and printed circuit board, the enclosure assembly comprising:

an intake subassembly, the intake subassembly including a first impeller, and a first motor;

an exhaust subassembly, the exhaust subassembly including a second impeller, and a second motor; and air guidance plate disposed over the printed circuit board, the air guidance plate including (1) a hollow structure at a first end of the air guidance plate that takes air from the intake subassembly, the hollow structure having a plurality of exhaust slots, and (2) air pathways that guide the air from the exhaust slots towards a second end of the air guidance plate and the exhaust subassembly.

19. The vehicle of claim 18, wherein the driving computing system is mounted in the vehicle at a tilt angle between 10 degrees to 30 degrees.

20. The vehicle of claim 18, wherein the enclosure assembly is mounted in the vehicle in an orientation where the second end of the air guidance plate is located vertically higher than the first end of the air guidance plate.

* * * * *